US012432739B2

(12) United States Patent
Shrivastava et al.

(10) Patent No.: US 12,432,739 B2
(45) Date of Patent: Sep. 30, 2025

(54) SIDELINK ADVANCED NOTIFICATION

(71) Applicant: Nokia Technologies Oy, Espoo (FI)

(72) Inventors: Rudraksh Shrivastava, Erligheim (DE); Jedrzej Stanczak, Wroclaw (PL); Sudeep Hegde, Stuttgart (DE); Oliver Blume, Stuttgart (DE); Hajo Bakker, Eberdingen (DE)

(73) Assignee: Nokia Technologies Oy, Espoo (FI)

( * ) Notice: Subject to any disclaimer, the term of this patent is extended or adjusted under 35 U.S.C. 154(b) by 709 days.

(21) Appl. No.: 17/765,869

(22) PCT Filed: Oct. 2, 2020

(86) PCT No.: PCT/EP2020/077675
§ 371 (c)(1),
(2) Date: Apr. 1, 2022

(87) PCT Pub. No.: WO2021/064183
PCT Pub. Date: Apr. 8, 2021

(65) Prior Publication Data
US 2022/0330318 A1 Oct. 13, 2022

Related U.S. Application Data

(60) Provisional application No. 62/910,838, filed on Oct. 4, 2019.

(51) Int. Cl.
*H04W 72/23* (2023.01)
*H04W 36/00* (2009.01)
(Continued)

(52) U.S. Cl.
CPC ......... *H04W 72/23* (2023.01); *H04W 36/037* (2023.05); *H04W 72/02* (2013.01); *H04W 72/0446* (2013.01); *H04W 76/20* (2018.02)

(58) Field of Classification Search
CPC ... H04W 72/23; H04W 76/20; H04W 36/037; H04W 72/02; H04W 72/0446;
(Continued)

(56) References Cited

U.S. PATENT DOCUMENTS

2020/0146082 A1* 5/2020 Chen ................... H04W 76/14
2020/0322939 A1* 10/2020 Cao ....................... H04W 72/02
(Continued)

OTHER PUBLICATIONS

3GPP, "Report of 3GPP TSG RAN2#106 meeting", May 13-17, 2019, 3GPP TSG-RAN WG2 meeting #107, R2-1908601, pp. 1-295 (Year: 2019).*

(Continued)

*Primary Examiner* — Paul H. Masur
(74) *Attorney, Agent, or Firm* — Barta Jones, PLLC

(57) ABSTRACT

For a UE in a wireless network and able to communicate via sidelink communications with other UE(s), the UE determines whether a specific condition exists indicating the UE has limited availability of CG resources used to communicate for the sidelink communications. The UE sends, using the sidelink communications, a message indicating the limited availability of the CG resources toward the other UE(s). Another UE receives the message indicating a limited availability of CG resources for the UE, and prepares an application in the other UE for a less sensitive mode of operation having less QoS than a mode having a normal QoS. A base station can configure the UE with the CG resources and provide a set of parameters to the UE to be used to form the message for the user equipment to transmit to the other UE(s) using sidelink communications.

20 Claims, 9 Drawing Sheets

(51) Int. Cl.
*H04W 72/02* (2009.01)
*H04W 72/0446* (2023.01)
*H04W 76/20* (2018.01)

(58) Field of Classification Search
CPC ... H04W 72/231; H04W 72/25; H04W 72/04; H04W 36/03; H04W 36/035
See application file for complete search history.

(56) References Cited

U.S. PATENT DOCUMENTS

| | | | |
|---|---|---|---|
| 2021/0045178 A1* | 2/2021 | Kung | H04W 76/18 |
| 2022/0279617 A1* | 9/2022 | Orsino | H04W 76/19 |

OTHER PUBLICATIONS

LG Electronics, "SLRB reconfiguration in state transition", Aug. 26-30, 2019, 3GPP TSG-RAN WG2 #107, R2-1910643, pp. 1-2 (Year: 209).*

Samsung, "Discussion on SLRB handling at transition from IDLE/Inactive to Connected", Aug. 26-30, 2019, 3GPP TSG-RAN WG2 Meeting #107, R2-1911322, pp. 1-2 (Year: 2019).*

3GPP, "Radio Resource Control (RRC); Protocol specification (Release 15)", Sep. 2018, 3GPP TS 36.331 V15.3.0, pp. 1-918 (Year: 2019).*

ETSI, "Radio Resource Control (RRC); Protocol specification", Jul. 2019, ETSI TS 136 331 V15.6.0, pp. 1-965 (Year: 2019).*

3GPP TSG-RAN WG2 Meeting #105bis, Xian, China, Apr. 8-12, 2019, R2-1903713, "Configured grant timer(s) for NR-U", Nokia, Nokia Shanghai Bell, 2 pgs.

3GPP TSG-RAN WG2 Meeting #107, Prague, Czech Republic, Aug. 26-30, 2019, R2-1909588, Resource Pool Aspects for NR V2X, InterDigital Inc., 5 pgs.

3GPP TSG-RAN WG2 Meeting #107, Prague, CZ, Aug. 26-30, 2019, R2-1911126, "Summary of Email discussion for [106#79][NR/V2X] Exceptional TX resource pool", MediaTek (rapporteur), 21 pgs.

3GPP TSG-RAN WG2 Meeting #107bis, Chongqing, China, Oct. 14-18, 2019, R2-1912070, "Left issues on MAC for NR-V2X", OPPO, 11 pgs.

3GPP TSG-RAN WG2 Meeting #107bis, Chongqing, P.R.China, Oct. 14-18, 2019, R2-1912175, "Type 1 Sidelink Configured Grant Validity Time", CATT, 4 pgs.

3GPP TSG-RAN WG2 Meeting #107bis, Chongqing, P.R.China, Oct. 14-18, 2019, R2-1912258, "Remaining issues on sidelink configured grant", vivo, 10 pgs.

3GPP TSG RAN WG2 Meeting #107bis, Chongqing, P.R.China, Oct. 14-18, 2019, R2-1913274, "Resource Pool Configuration", LG Electronics Inc., 3 pgs.

3GPP TSG RAN WG2 Meeting #107bis, Chongqing, P.R.China, Oct. 14-18, 2019, R2-1912379, "Consideration on model resource allocation", ZTE Corporation, Sanechips, 8 pgs.

* cited by examiner

SIDELINK ADVANCED NOTIFICATION

CROSS REFERENCE TO RELATED APPLICATION

This patent application is a U.S. National Stage application of International Patent Application Number PCT/EP2020/077675 filed Oct. 2, 2020, which is hereby incorporated by reference in its entirety, and claims priority to U.S. provisional application 62/910,838 filed Oct. 4, 2019, which is hereby incorporated by reference in its entirety.

TECHNICAL FIELD

This invention relates generally to wireless communications and, more specifically, relates to sidelink (SL) and configured grant (CG) scenarios in the wireless communications systems.

BACKGROUND

There are an increasing number of vehicles that communicate with each other. Beyond informative Cooperative Awareness Messages (CAM) and Decentralized Environmental Notification Messages (DENM), more advanced communications exchange critical and time-sensitive information. This communication may be for accident avoidance, such as having two or more vehicles in a joint driving maneuver (e.g., platooning, lane merge), where the two vehicles exchange relative location or distance information. This could also be for self-driving or autonomous vehicles or for devices in a factory environment.

To enable these communications, new radio (NR) and other standards support specifications involving, for example, sidelink communications. The sidelink (SL) communications are between two vehicles, each containing a user equipment (UE) performing the communication. The two UEs also communicate with an LTE, an NR or beyond wireless network. The SL communications may be vehicle-to-everything (V2X) communications and may involve various supported modes.

Due to the speeds and issues involved, a relatively high quality of service (QoS) is used for the UEs. To support the high QoS, configured grants (CGs) may be used, which provide for grant-free operation for achieving low transmission latencies. That is, the network defines CG SL resources for the UE to use with SL peer UEs. A possible reason for failing the SL QoS requirements is an interruption in the Uu link between UE and the wireless network that controls the CG SL resources, while actually the SL would be available (without CG, there is no QoS guarantee). This interruption might occur during the handover process or during radio link problems, i.e., out-of-sync indications leading to radio link failure.

However, the SL and CG mechanisms may be improved, such as during a handover process or in response to a radio link failure (RLF).

BRIEF SUMMARY

This section is intended to include examples and is not intended to be limiting.

In an exemplary embodiment, a method is disclosed that includes, for a user equipment in a wireless network and able to communicate via sidelink communications with one or more other user equipment, determining by the user equipment whether a specific condition exists indicating the user equipment has limited availability of configured grant resources used to communicate for the sidelink communications. The method also includes sending, by the user equipment and using the sidelink communications, a message indicating the limited availability of the configured grant resources toward the one or more other user equipment.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus to perform operations comprising: for a user equipment in a wireless network and able to communicate via sidelink communications with one or more other user equipment, determining by the user equipment whether a specific condition exists indicating the user equipment has limited availability of configured grant resources used to communicate for the sidelink communications; and sending, by the user equipment and using the sidelink communications, a message indicating the limited availability of the configured grant resources toward the one or more other user equipment.

An exemplary computer program product includes a computer-readable storage medium bearing computer program code embodied therein for use with a computer. The computer program code includes: code for, for a user equipment in a wireless network and able to communicate via sidelink communications with one or more other user equipment, determining by the user equipment whether a specific condition exists indicating the user equipment has limited availability of configured grant resources used to communicate for the sidelink communications; and code for sending, by the user equipment and using the sidelink communications, a message indicating the limited availability of the configured grant resources toward the one or more other user equipment.

In another exemplary embodiment, an apparatus comprises means for performing: for a user equipment in a wireless network and able to communicate via sidelink communications with one or more other user equipment, determining by the user equipment whether a specific condition exists indicating the user equipment has limited availability of configured grant resources used to communicate for the sidelink communications; and sending, by the user equipment and using the sidelink communications, a message indicating the limited availability of the configured grant resources toward the one or more other user equipment.

In an exemplary embodiment, a method is disclosed that includes receiving, from a user equipment and at another user equipment using sidelink communications in a wireless network, a message indicating a limited availability of configured grant resources for the user equipment. The method includes preparing, by the other user equipment, an application in the other user equipment for a less sensitive mode of operation having less quality of service than a mode having a normal quality of service.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus to perform operations comprising: receiving, from a user equipment and at another user equipment using sidelink communications in a wireless network, a message indicating a limited availability of configured grant resources for the user equipment; and preparing, by the other user equipment, an application in the other user equipment for a less sensitive mode of operation having less quality of service than a mode having a normal quality of service.

An exemplary computer program product includes a computer-readable storage medium bearing computer program code embodied therein for use with a computer. The computer program code includes: code for receiving, from a user equipment and at another user equipment using sidelink communications in a wireless network, a message indicating a limited availability of configured grant resources for the user equipment; and code for preparing, by the other user equipment, an application in the other user equipment for a less sensitive mode of operation having less quality of service than a mode having a normal quality of service.

In another exemplary embodiment, an apparatus comprises means for performing: receiving, from a user equipment and at another user equipment using sidelink communications in a wireless network, a message indicating a limited availability of configured grant resources for the user equipment; and preparing, by the other user equipment, an application in the other user equipment for a less sensitive mode of operation having less quality of service than a mode having a normal quality of service.

In an exemplary embodiment, a method is disclosed that includes at a base station in a wireless network, configuring a user equipment with configured grant resources used to communicate between the user equipment and one or more other user equipment for sidelink communications. The method additionally includes providing, by the base station and using radio resource control procedures, a set of parameters to the user equipment. The set of parameters are to be used by the user equipment to form a message for the user equipment to transmit to the one or more other user equipment using sidelink communications. The message indicates to the one or more other user equipment that the user equipment has limited availability of the configured grant resources for the sidelink communications.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus to perform operations comprising: at a base station in a wireless network, configuring a user equipment with configured grant resources used to communicate between the user equipment and one or more other user equipment for sidelink communications; and providing, by the base station and using radio resource control procedures, a set of parameters to the user equipment, the set of parameters to be used by the user equipment to form a message for the user equipment to transmit to the one or more other user equipment using sidelink communications, the message indicating to the one or more other user equipment that the user equipment has limited availability of the configured grant resources for the sidelink communications.

An exemplary computer program product includes a computer-readable storage medium bearing computer program code embodied therein for use with a computer. The computer program code includes: code for, at a base station in a wireless network, configuring a user equipment with configured grant resources used to communicate between the user equipment and one or more other user equipment for sidelink communications; and code for providing, by the base station and using radio resource control procedures, a set of parameters to the user equipment, the set of parameters to be used by the user equipment to form a message for the user equipment to transmit to the one or more other user equipment using sidelink communications, the message indicating to the one or more other user equipment that the user equipment has limited availability of the configured grant resources for the sidelink communications.

In another exemplary embodiment, an apparatus comprises means for performing: at a base station in a wireless network, configuring a user equipment with configured grant resources used to communicate between the user equipment and one or more other user equipment for sidelink communications; and providing, by the base station and using radio resource control procedures, a set of parameters to the user equipment, the set of parameters to be used by the user equipment to form a message for the user equipment to transmit to the one or more other user equipment using sidelink communications, the message indicating to the one or more other user equipment that the user equipment has limited availability of the configured grant resources for the sidelink communications.

DETAILED DESCRIPTION OF THE DRAWINGS

Figure 1:
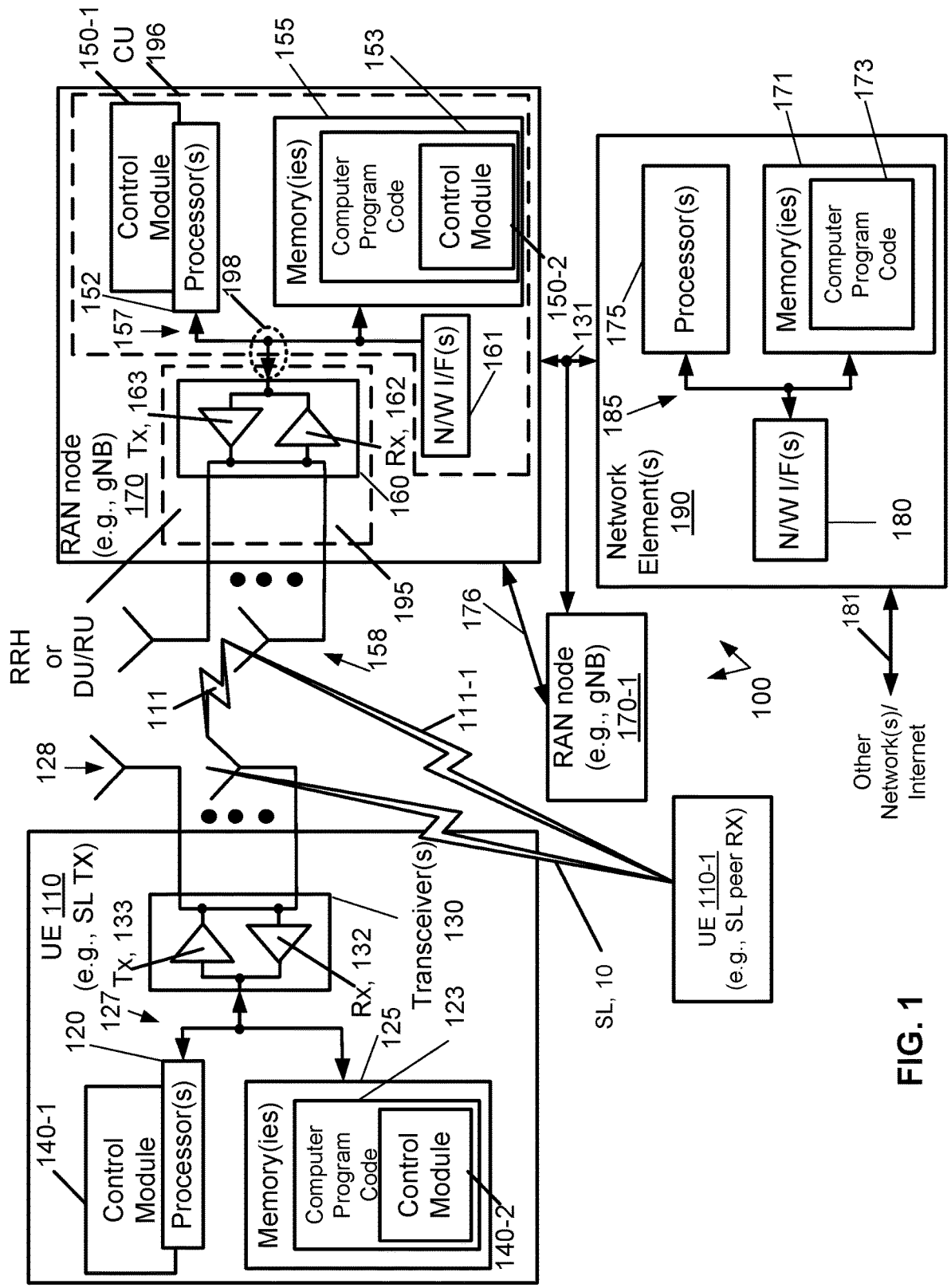
FIG. 1 is a block diagram of one possible and non-limiting exemplary system in which the exemplary embodiments may be practiced.

The following abbreviations that may be found in the specification and/or the drawing figures are defined as follows:

3GPP third generation partnership project
5G fifth generation
5GC 5G core network
AMF access and mobility management function
ARQ automatic repeat request
AS layer access stratum layer
CG configured grant
C-PDU control PDU
CU central unit
DU distributed unit
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
FFS for further study
gNB (or gNodeB) base station for 5G/NR, i.e., a node providing NR user plane and control plane protocol terminations towards the UE, and connected via the NG interface to the 5GC
HARQ hybrid automatic repeat request
HoF handover failure
I/F interface
InC in-coverage
KPI key performance indicator
LTE long term evolution
MAC medium access control
MME mobility management entity
ng or NG next generation
ng-eNB or NG-eNB next generation eNB
NR new radio
N/W or NW network
OoC out-of-coverage
PCI physical cell identifier
PDCP packet data convergence protocol
PDU protocol data unit
PHY physical layer
QoS quality of service
RAN radio access network
RAT radio access technology
RB radio bearer
Rel release
RLC radio link control
RRH remote radio head
RRC radio resource control
RU radio unit
Rx or RX receiver
SDAP service data adaptation protocol
SGW serving gateway
SIB system information block
SL sidelink
SL SP sidelink signaling protocol
SLRB or SL RB sidelink radio bearer
SMF session management function
SPS semi-persistent scheduling
TS technical specification
Tx or TX transmitter
UE user equipment (e.g., a wireless, typically mobile device)
UPF user plane function
V2X vehicle-to-everything The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The exemplary embodiments herein describe techniques for NR sidelink advanced notification and configured grant continuation mechanism to avoid SL QOS degradation during specific events such as handover process or RLF. Additional description of these techniques is presented after an introduction to a system where the exemplary embodiments may be used is described.

Turning to FIG. 1, this figure shows a block diagram of one possible and non-limiting exemplary system in which the exemplary embodiments may be practiced. A user equipment (UE) 110, radio access network (RAN) node 170, and network element(s) 190 are illustrated. In FIG. 1, a user equipment (UE) 110 and a UE 110-1 are in wireless communication with a wireless network 100. A UE is a wireless, typically mobile device that can access a wireless network. The UE 110-1 is assumed to be similar to the UE 110, and only an exemplary configuration of the UE 110 is described. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a control module 140, comprising one of or both parts 140-1 and/or 140-2, which may be implemented in a number of ways. The control module 140 may be implemented in hardware as control module 140-1, such as being implemented as part of the one or more processors 120. The control module 140-1 may be implemented also as an integrated circuit or through other hardware such as a programmable gate array. In another example, the control module 140 may be implemented as control module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111 and the UE 110-1 communicates with RAN node 170 via a wireless link 111-1. The wireless links 111 may use an air interface such as a Uu interface.

In examples below, the UE 110 is considered to be a sidelink (SL) transmission (TX) UE, and the UE 110-1 is considered to be a receiving SL peer UE (also referred to as an SL RX UE or RX SL UE). For SL, the two UEs 110, 100-1 communicate using sidelink (SL) link 10. It is noted that the term "sidelink" also refers to a UE to UE interface for sidelink communication. See 3GPP TS 36.331 V15.6.0 (2019-06). It is further noted that the sidelink 10 may be on different frequency from the Uu interface used over link 111, or the Uu interface used over link 111 and sidelink 10 may operate on the same frequency as the Uu communication towards the gNB, i.e. frequency sharing with uplink. This means there could be multiple transceivers 130 for a UE 110 (also transceivers 160, for the gNB 170), each (e.g., potentially at the same time) operating on a different frequency, or a single transceiver 130 using time-division for the SL and cellular communications and using the same frequency.

The RAN node 170 is a base station that provides access by wireless devices such as the UEs 110, 110-1 to the wireless network 100. Another RAN node 170-1 is shown, and it also a base station that provides access by wireless devices such as the UEs 110, 110-1 to the wireless network 100, and is assumed to be similar to RAN node 170 such that exemplary implementation of RAN node 170 is only described. If the UEs 110, 110-1 connect to the RAN node 170-1, this would be though links (not shown) similar to links 111, 111-1. The RAN node 170-1 is assumed in certain situations to be a candidate node for handover of a UE 110, 110-1.

It is noted that the RAN nodes 170, 170-1 are referred to as gNBs 170, 170-1. This is only for ease of reference, as the RAN nodes 170, 170-1 may be other network (e.g., access) nodes, as described below.

The RAN node 170 may be, for instance, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface to a 5GC (e.g., the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of an RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a control module 150, comprising one of or both parts 150-1 and/or 150-2, which may be implemented in a number of ways. The control module 150 may be implemented in hardware as control module 150-1, such as being implemented as part of the one or more processors 152. The control module 150-1 may be implemented also as an integrated circuit or through other hardware such as a programmable gate array. In another example, the control module 150 may be implemented as control module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the control module 150 may be distributed, such as being distributed between the DU 195 and the CU 196, or be implemented solely in the DU 195.

The one or more network interfaces 161 communicate over a network such as via the links 176 and 131. Two or more RAN nodes 170, 170-1 communicate using, e.g., link(s) 176. The link(s) 176 may be wired or wireless or both and may implement, e.g., an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, e.g., fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that the base station that forms the cell will perform the functions. The cell makes up part of a base station. That is, there can be multiple cells per base station. For instance, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(s)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the network element(s) 190, and note that both 5G and LTE functions might be supported. The RAN nodes 170, 170-1 are coupled via link(s) 131 to a network element 190. The link(s) 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, vehicles with a modem device for wireless V2X communication, image capture devices such as digital cameras having wireless communication capabilities, gaming devices having wireless communication capabilities, music storage and playback appliances having wireless communication capabilities, Internet appliances (including Internet of Things devices) permitting wireless Internet access and possibly browsing, IoT devices with sensors and/or actuators for automation applications with wireless communication, tablets with wireless communication capabilities, as well as portable units or terminals that incorporate combinations of such functions.

Having thus introduced one suitable but non-limiting technical context for the practice of the exemplary embodiments of this invention, the exemplary embodiments will now be described with greater specificity.

The exemplary embodiments here concern the use of V2X Sidelink (SL) resources in systems such as 5G systems in particular, although they are applicable to any systems using SL or similar techniques. NR SL resources can be managed and assigned by a serving base station, through a mode referred to as NR mode 1, or the NR SL resources can be selectively used by the UE in a carrier-sensing based approach, known as NR mode 2.

NR mode 2 is used outside the coverage of a network 100 or adopts resources that are assigned by the network 100 for mode 2 type of use (e.g., exceptional pool resources). Obviously, access to mode 2 resources is in competition to other users and no Semi-Persistent Scheduling (SPS) or Configured Grants (CGs) is feasible. Consequently, while using the exceptional pool resources, Quality of Service (QoS) cannot be guaranteed to the UE(s).

The NR mode 2 exceptional pool is also used as a fallback for mode 1. This creates an issue for QoS sensitive applications when mode 1 resources become unavailable due to certain events such initiation of 3GPP Uu timers (T304/T310), Radio Link Failure (RLF) or Handover Failure (HoF), and the like.

In RAN2 #106 meeting (see R2-1908601, 3GPP TSG-RAN WG2 meeting #107, 13-17 May 2019, Agenda Item: 2.2, ETSI MCC, "Report of 3GPP TSG RAN2 #106 meeting, Reno, USA), the following agreement was achieved for exceptional TX resource pool:

Agreements on exceptional TX resource pool in RAN2 #106:
1: As in LTE V2X, NR V2X adopts the concept of exception pool.
2: As in LTE V2X, when configured in mode 1, UEs use exceptional pool in the following cases:
   i) When a UE detects Uu physical layer problems or radio link failure.
   ii) Before a UE finishes the initiated connection (re)establishment.
   iii) During handover.

Based on an email discussion in the following reference, regarding the exceptional TX resource pool in RAN #107, further agreements and updates on exceptional TX resource pool and configured grant type were as follows (see R2-1911126, 3GPP TSG-RAN WG2 Meeting #107, Prague, Czech Republic, 26-30 Aug. 2019, "Summary of Email discussion for [106#79][NR/V2X] Exceptional TX resource pool"):

It is supported that target cell provide configured sidelink grant type ½ in HO command. The UE starts configured SL grant type 1 once it is received.

A mode-1 UE is allowed to continue using the configured SL grant type 1 when beam failure or physical layer problem in NR Uu occur. FFS how long the SL configured grant is considered valid.

As additional information with respect to this technical area, 3GPP has defined several timers which are triggered in certain cases/conditions such as handover and physical layer problems leading to RLF. See FIG. 2, which illustrates different timers and how they are triggered for LTE procedures. This figure in particular illustrates different Uu interface Timers and how they are triggered for LTE procedures, and also includes the current 3GPP RAN-2 standardization status. It is noted that the same timers are defined for NR, although the exact names of the messages might differ from LTE. 3GPP has defined the timers T304, T310 and T311 for the Uu interface to deal with situations such as Handover failure (HoF) and Radio Link Failure (RLF). See 3GPP TS 36.331 V15.3.0.

For handover failure 230, when the UE 110 receives the RRCConnectionReconfiguration including the mobilityControlInfo (see reference 210), the UE initiates timer T304 and tries to connect to the target radio cell (e.g., formed by the gNB 170-1). That is, the timer T304 is triggered and the UE has to finalize the handover procedure as long as the timer T304 is running, i.e., before the T304 expires. When the T304 timer expires, the timer T311 is started and the UE tries to re-establish RRC connection (see reference 270) to the target or any other radio cell. More particularly, if T304 expires, a handover failure 230 is declared and the UE starts the timer T311. If a re-establishment is not possible prior to expiration of T311, the UE enters the RRC_IDLE state and loses its RRC configurations. See reference 280.

For radio link failure 260, the timer T310 is initiated upon receiving N310 consecutive "out-of-sync" indications for the cell from lower layers (see 3GPP TS 36.331 V15.3.0), which is illustrated by reference 240 and the detection of physical layer problems in RRC_CONNECTED mode. Specifically, when the UE detects PHY layer related problems (e.g., when the UE receives N310 consecutive out-of-sync INDs from lower layers), the UE starts the timer T310. Note that "layers" refers to protocol stack layers, where lower layers are layers closer to a physical layer and upper layers are layers closer to (or possibly higher than) a network layer. When the timer T310 expires, it is understood by the UE that a RLF has occurred (see reference 260) and the timer T311 is initiated to re-establish the RRC connection. T310 is stopped upon receiving N311 consecutive in-sync indications from lower layers, upon triggering the handover procedure and upon initiating the connection re-establishment procedure (i.e. when T311 starts). If T310 expires, a Radio Link Failure (RLF) is declared and the UE starts the timer T311. When the timer T311 expires, the UE enters the RRC_IDLE state (reference 280) and loses its RRC configurations.

Regarding RRC connection re-establishment 270, if the timer T311 is running, the UE initiates the RRC connection re-establishment procedure. The timer T311 is terminated if a suitable E-UTRA cell or a cell using another RAT is selected. If T311 expires, the UE enters (reference 280) the RRC_IDLE state. Within the RRC_IDLE state, the UE can only use NR SL mode 2 resources, which are selected based on sensing of the radio channel.

In additional detail, the mechanism by which the UE obtains the configuration to map PC5 QoS profile to SLRB and the SLRB configurations depends on the UE's RRC state (i.e. IDLE/INACTIVE or CONNECTED) and the UE's coverage status (i.e., In-coverage or Out-of-coverage). In this direction, the change of RRC state and/or coverage status of a UE could affect its new established or ongoing SL connections. Similarly, the new established or ongoing SL connections can also be affected if Handover Failure (HoF), Radio Link Failure (RLF) or any Layer 1 problems occur.

According to R2-1908601, as soon as T304/T310 timers start, the UEs lose their CG and must use exceptional pool resources. That is, while the timer T304, T310 or T311 are running, the UE has to use mode-2 exceptional pool resources from, e.g., the v2x-CommTxPoolExceptional pool, which currently does not support SPS/CG, see chapter 5.10.13.1 of 3GPP TS 36.331 V15.6.0 (2019-06), i.e. all configured (CG) SPS sidelink resources can no longer be used and the QoS requirements for a UE or group of UE(s), communicating over sidelink, can no longer be achieved. In addition, the UE in RRC_IDLE state also discards all SPS/CG configurations for both Uu and SL communications. This could lead to interruption in SL operations and delivered services over SL. As per current LTE systems, it is possible for the UE to switch to specific reserved resource pool allocated for SL-operations. But in this case, since there will also be no dedicated SPS/CG available for the SL, the QoS for applications or services delivered over the SL cannot be guaranteed. Triggering and stopping of conditions (such as activation of Uu timers (T304/T310)) that cause switching to exceptional pool resources may be short in duration and could also occur multiple times in a short time period. In such a case, the UEs may experience a Ping-Pong effect which could lead to switching between CG to exceptional pool and vice-versa.

As per the RAN #107 agreements, a mode-1 UE can continue using the configured SL grant type 1 when beam failure or physical layer problem in NR Uu occurs. See reference 250. It is FFS how long the SL configured grant is considered valid. The RAN will introduce a SL grant continuation mechanism. It is FFS what will be the grant continuation mechanism and how long the SL Grant can be continued.

In RAN2 #107, the following proposals were presented in R2-1910643, 3GPP TSG-RAN WG2 #107, August 2019, Agenda Item: 11.4.6; LG Electronics Inc. "SLRB reconfiguration in state transition":

If a UE performing NR sidelink transmissions enters RRC_CONNECTED, it continues to perform NR sidelink transmissions as configured in RRC_IDLE or RRC_INACTIVE until NG-RAN potentially reconfigures SLRBs (except for resource pool configuration).

If a UE performing NR sidelink transmissions leaves RRC_CONNECTED, it continues to perform NR sidelink transmissions as configured in RRC_CONNECTED until a timer expires, if configured by NG-RAN (except for resource pool configuration).

In RAN2 #107, the following proposals were presented R2-1911322, 3GPP TSG-RAN WG2 #107, August 2019, Agenda Item: 11.4.6, Samsung, "Discussion on SLRB handling at transition from IDLE/INACTIVE to CONNECTED":

Upon entering RRC_CONNECTED, a UE can continue using the SLRB(s) established in RRC_IDLE/INACTIVE.

Upon entering RRC_CONNECTED, a UE provides the information (i.e. destination, QFI, cast type, etc.) to the gNB/ng-eNB for the already established SLRB(s).

Upon entering RRC_CONNECTED, a UE can indicate to the gNB/ng-eNB that it is currently performing V2X communication using one or more SLRB(s) which are established using SLRB configuration provided in V2X-specific SIB.

In case of a handover process, in RAN #107 agreements were made which support that target cell may provide configured sidelink grant type 1/2 in HO command. See reference 220. If the "support" will be implemented as an optional feature, i.e. there is not always a CG in the HO command, then a new timer (for the HO case) should be introduced which defines how long the CG from the source cell can remain valid. The new timers to facilitate grant-continuation over the SL are a part of exemplary embodiments described herein. It is noted that the CG to which a timer facilitates a grant-continuation is either the CG from the source cell or from the target cell.

With respect to the CG being either from the source or target cell, if a Tx UE moves from a source cell (e.g., BS #1) to a second/target BS #2, this BS #2 might define new CG #2, which is used by the Tx UE as soon as this CG #2 is received. The proposed timer for HO is then related to the new CG #2. On the other hand, if the BS #2 does not define a new CG #2 then the CG from the source BS #1 is still valid. The proposed timer for HO is then related to the existing CG.

When initiation of T304/T310 timers occurs, the SL peer UE(s)—communicating over sidelink with the Tx UE, are not aware that the Tx UE has triggered the T304/T310 timers and may experience QoS problems, as the CG is not valid and the Tx UE uses the exceptional pool resources. The SL peer UEs communicating with the Tx UE are also not aware of how long the Tx UE will stay in this state of uncertainty and the fact that the Tx UE may undergo RLF or HoF and may change its RRC state depending on the network state and coverage and the like.

In case of HO or radio link problems, it cannot be excluded that a dedicated UE has to switch from base station-controlled mode 1 resources to exceptional resources which may lead to degradation of QoS. Other UEs communicating with the dedicated UE are not aware about the potentially imminent switch between resources and the degradation of QoS. To enable the other UEs to react appropriately, the other UEs should be informed by the dedicated Tx UE. Consider the following examples.

The degradation of QoS due to use of exceptional pool resources might have impact on the stability of a platoon of vehicles, as one example. If it is possible to inform the other SL peer UEs of the platoon by a Tx UE, still using the CG grants based on the new timers, the other SL peer UEs of the platoon can react accordingly. If the SL peer UEs are not prepared, this could cause sudden and unexpected degradation of QoS and therefore service interruption. This could be disastrous for QoS sensitive applications and use cases such as V2X platooning, remote driving, and the like.

For non-platoon (also applicable for the platooning usecase) SL peer UEs, such pre-notification message over continued CG via an exemplary solution could help the SL peer UEs respond by changing their QoS policies towards the TX UE with problems, help them in radio resource management, help them change inter-vehicle distance, or simply help them in releasing the SLRB connection. The SL peer UEs can also join a different group or stay independent until the specific UE has resolved its issue. Alternatively, the Tx UE with issues could also leave the group and join again when its issues are resolved, and in that case the overall non-platoon group communication is not affected.

Thus, a new mechanism is required which can ensure continuation of, e.g., a configured grant temporarily for an extended but fixed time duration and inform the SL peer UE(s) of the possible upcoming changes in QoS policies in case the temporary extension of the CG expires, or the UE goes to an RRC_IDLE/INACTIVE state. With such temporary extension of CG and an advanced notification of the ongoing processes to the SL peer UE(s), the Application/AS Layer/UE/Network can get additional time to prepare and respond to any issue that the UE(s) and/or the network is experiencing. With the proposed exemplary CG continuation mechanisms and the SL peer UE pre-notification procedure, the Application/AS Layer/UE/Network can get additional time to respond to any issue that the UE and/or the network is experiencing.

As a brief introduction, the description below has two main parts:

1. A novel mechanism to inform SL peer UEs. The first part of the description below focusses on providing a novel method which, under specific conditions (discussed below) inform the SL peer UE(s) via unicast, groupcast, or broadcast about the limited availability of CG. Consequently, via the proposed exemplary mechanisms, the SL peer UEs are indicated that there is a probability the Tx UE may lose CG due to issues such as HoF or RLF, which could lead to QoS degradation.

2. A mechanism to continue CG for a fixed (e.g., pre-defined) time duration in response to a UE experiencing issues or being in the process of carrying out a handover procedure (i.e., when T304/310 are triggered). The second part focuses on providing new methods to allow extended use of configured grant during handover process or when specific timers such as T304/T310 are triggered. To achieve this, new timers are introduced, namely SL_HoF_Timer and SL_RLF_Timer. The details of the mechanisms associated with the new timers are provided below.

Now that a brief introduction has been provided, an additional overview is provided. As discussed above, when a UE with Configured Grant (CG) changes its RRC state and/or moves from InC to OoC areas and vice-versa, as per current techniques, the UE switched to exceptional pool resources, which may not guarantee SL QoS. Consequently, the TX UE 110 undergoes a state of uncertainty, such as the following: (1) Uncertainty whether the connection can be recovered in time to maintain the SL CG or whether the UE will have to fall back to mode 2; and/or (2) Uncertainty if mode 2 resources are available. The instant examples address at least the uncertainties in (1), as the UE is allowed to keep its CG during this state, so communication is therefore not uncertain, but its continuation after the time for the maintained CG state is. The new messages to the SL peer UEs inform about the uncertain state, but do not remove uncertainty at least for whether the CG state will be maintained after the uncertain time. The method to configure the SLRB depends on the TX UE's RRC state and coverage status as specified in 3GPP TS 36.331. However, during the uncertain time, the SL peer UEs of a Tx UE are not aware of the of the Tx UE's current state and the probability of having QoS degradation or interruption in the SL connection due to Tx UE initiating 3GPP specified timers (e.g., T304/T310) or changing the UE's RRC state or moving into a different network coverage area.

An exemplary proposal herein is a novel mechanism that indicates to the SL peer UE(s) that the availability of CG over SL is limited, e.g., due to an event such as triggering/expiration of T304 or T310 or T311 or based on new timers (SL_HoF/RLF_Timer) (which could also be longer than T311). Note that this concerns an extended availability of CG which is available for a limited time. This extension is in addition to conventional techniques. The indication may be performed by a proposed SL_UE_Assistance message, in an exemplary embodiment. Exemplary embodiments also provide a new solution that inform the SL peer UE(s), of a selected Tx UE, of the ongoing timers and related information.

In addition, two new methods are introduced in exemplary embodiments for continuation of SL CG for a predetermined fixed duration:

1. Using new timers, namely SL_HoF_Timer and RLF_Timer (for Hof and RLF cases, respectively); and
2. Extension/Modification of RRCConnectionReconfiguration), i.e. via RRC signaling.

Concerning exemplary proposed mechanisms to inform SL peer UE(s) 110-1, consider the following. A TX UE 110, in response to entering a state which leads to uncertainty whether a SL connection can be continued or not (for example triggering event such as initiation of Uu RRC timers (T310/T304)), may inform the SL peer UEs 110-1 about the extended and limited availability of the CG. That is, the CG availability is extended, for a limited time. This informing may be achieved in an exemplary embodiment via a new message configured with a set of information/parameters transmitted either through unicast or groupcast (or possibly broadcast) transmission. One exemplary objective of this new SL_UE_Assistance message is to make the SL peer UEs 110-1 aware that the CG has been extended and it is available only for a fixed time duration and that there may be a disruption in the ongoing SLRB associated with a specific Tx UE.

In particular, an exemplary proposed mechanism by the TX UE 110 informs the SL peer UE(s) 110-1 that the availability of the extended CG over SL is limited, e.g., while T304 or T310 or T311 is running or based on the new timers (e.g., SL_HoF/RLF_Timer, which could be longer than T311). This mechanism may be performed with the help of a new configurable SL_UE_Assistance message. This enables the SL peer UEs 110-1 to prepare themselves for either potential QoS degradation or service interruption or prepare for a mode switch event, default SLRB configuration, and the like. Exemplary details regarding the parameters and configuration of this new SL_UE_Assistance and the procedure to transmit this message are described in detail below. This new SL_UE_Assistance message to the SL peer UEs can also be sent, in a further exemplary embodiment, via a Uu interface (between the Tx UE and the network) if the Tx UE is still in RRC_CONNECTED state. Furthermore, the message can also use SL peer UEs as relays to indicate to the gNB about the Tx UE state (for e.g., SL or Uu running timers, CG limited availability, and the like) which could lead to reduced Uu signaling and re-transmission attempts. Consequently, this can help the gNB 170 to re-configure the Uu and/or SL resources for the concerned Tx UE before the Tx UE changes its RRC state or through SIB/Paging (if the Tx UE changes its state to RRC_IDLE). For instance, if a Tx UE is experiencing HO/RLF issues, the gNB does not know about these issues immediately and the gNB only knows after a certain time, e.g., when the re-transmission attempts fails. This message can therefore help the gNB to run a debugging test or self-recovery procedures to understand if there are any problems from the network side if the gNB is aware earlier about the issues that a UE is experiencing. Thus, with the help of this pre-notification message, the Application/AS (Access Stratum) Layer/UE/Network can get additional time to respond to any issue that the UE and/or the network is experiencing. The new SL_UE_Assistance message for indicating issues, limited availability of the extended/continued CG and related parameters as well as the SL_UE_Assistance message sent to the peer UE(s) when the Tx UE has recovered (i.e., when the triggering event/timers are stopped and the selected Tx UE does not go to RRC_IDLE/INACTIVE state) may be considered as important messages and can therefore, in certain exemplary embodiments, be sent using a feedback control mechanism.

Concerning exemplary configured grant continuation procedures, for continuation of the CG, two types of timers are proposed herein in certain examples, namely SL_HoF_Timer and SL_RLF_Timer, respectively. Both the timers may be configured with different values and provide a temporary means to ensure SL QoS for an extended period. During the handover process, in addition to the timers, a different method for CG continuation is also proposed in exemplary embodiments, which involves extension of the RRCConnectionReconfiguration message from the gNB 170. The RRCConnectionReconfiguration message can be used to indicate extension or continuation of the CG to the UE until, e.g., a pre-defined time.

With the help of CG continuation mechanism proposed herein, the Application/AS Layer/UE/network can get additional time to respond to any issue that the Tx UE and/or the network is experiencing. Note that the "network" is primarily the gNB 170, but can also include other network elements 190. Using the proposed examples herein (such as the SL_UE_Assistance message), the Tx UEs 110 can communicate the critical information (such as timer validity, UE connection state, QoS related information and the like (more details in are described below) to the SL peer UE(s) 110-1 and any respective control entity. The control entity is any application function that is consuming the connectivity service of the SL peer UE.

Figure 2:
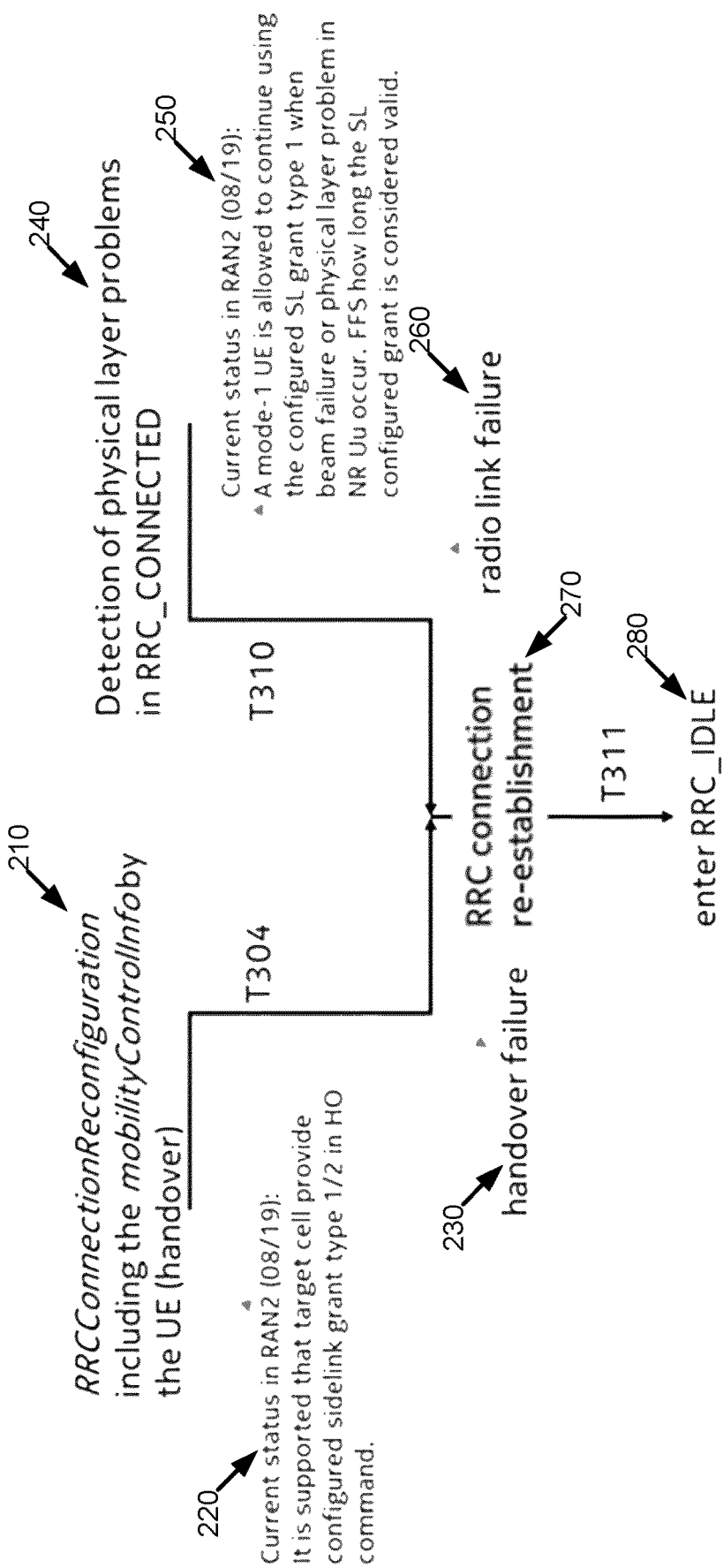
FIG. 2 illustrates different timers and how they are triggered for LTE procedures, in particular different Uu Timers and how they are triggered for LTE procedures also including the current 3GPP RAN-2 standardization status.

Depending on the Tx UE's RRC connection state, the following exemplary scenarios can be considered (see also FIG. 2 for a diagram involving the timers described below).

1) If the handover is successful, i.e., the timer T304 is stopped while not yet expired, then the CG (from the source gNB 170) can be used until a new CG is received from the target gNB 170-1 (e.g. after RACH access and synchronization). In this case, the new SL timer (SL_HoF_Timer) will also be stopped. It is supported that target cell provides configured sidelink grant type 1/2 in a HO command. In this case, the UE starts configured SL grant type 1/2 once the HO command is received.

Additionally, if the handover is successful, i.e., the timer T304 is stopped while not yet expired, then the CG (from the target gNB 170) can be used further on. In this case, the new SL timer (SL_HoF_Timer) will also be stopped.

2) If the connection is recovered before timer T310 is expired, then the CG (from the source gNB 170 or target gNB 170-1) can be used. The new SL timer (SL_RLF_Timer) will be stopped.

3) If the connection is recovered before timer T311 is expired, then the CG (e.g., the Tx UE again connects to the source gNB 170) or a new CG (from the target gNB 170-1 or any other cell) can be used. The new SL timer (SL_HoF/RLF_Timer) will be stopped. It is noted that the two new timers are introduced namely SL_HoF_Timer and SL_RLF_Timer for two different types of scenarios. Therefore, either the SL_HoF or SL RLF timer is stopped, depending whether T311 is following T304 or T310, respectively.

4) If the timer T311 expires, and the new SL timer is still running, then the CG from the source gNB 170 can still be used until the new SL timer expires.

4) If the new SL timer is expired before timer T311 expires, then the UE 110 switches to Mode-2 and uses the exceptional pool resources. The Tx UE also switches to Mode-2 exceptional pool after the timer T311 expires and the SL timer is not continued or is not present.

Once the connection of the selected UE 110 recovers from any of the above-mentioned scenarios, a second SL_UE_Assistance message (part of an exemplary proposed solution) is sent to inform the SL peer UE(s) 110-1 that the Tx UE 110 has recovered and whether the CG (from the source gNB) can be used, or a new CG (e.g. from the target gNB) is available. In an exemplary embodiment, this message is sent with feedback control.

It is noted that, in case of beam failure, it is still under discussion when this document was written in 3GPP RAN2 as to whether the Tx UE can keep using the SLRB. If it will be decided not to allow this, the mechanisms of the exemplary embodiments herein can be applied also for beam failure.

Exemplary technical features and improvements described herein include one or more of the following:

a) A new configurable SL_UE_Assistance message communicated to the peer UE(s) via unicast/groupcast/broadcast and supported by a CG continuation mechanism;

b) Extensions in Uu RRC procedures to configure the SL_UE_Assistance message;

c) New SL timers (e.g., SL_HoF/RLF_Timer), which can be applied in different ways described in more detail below;

d) Extension to RRCConnectionReconfiguration Message (applies only for the handover case);

e) Mechanism to send the SL_UE_Assistance message via cast unicast, groupcast, or broadcast to the peer UE (s); and/or f) Indication (e.g., using the SL_UE_Assistance message) to SL peer UE(s) 170-1 when the UE 110 resolves any issues due to which the UE 110 initiated the corresponding timers and transmitted the SL_UE_Assistance message in the first step (from (a) above).

In an exemplary embodiment, the gNB configures, e.g., via a Uu RRC procedure, the TX UE to support/not-support the advanced-notification and CG continuation functionality for a multi-RAT scenario.

The SL peer UE(s) can be informed in the following exemplary ways:

a. The message indicating support/no-support of the pre-notification and CG continuation functionality for the multi-RAT scenario can be sent from Tx UE to SL peer UE(s) over the SL; or b. The base station can send the message directly over Uu interface to the relevant SL peer UE(s) via dedicated or broadcast signaling.

Figure 3:
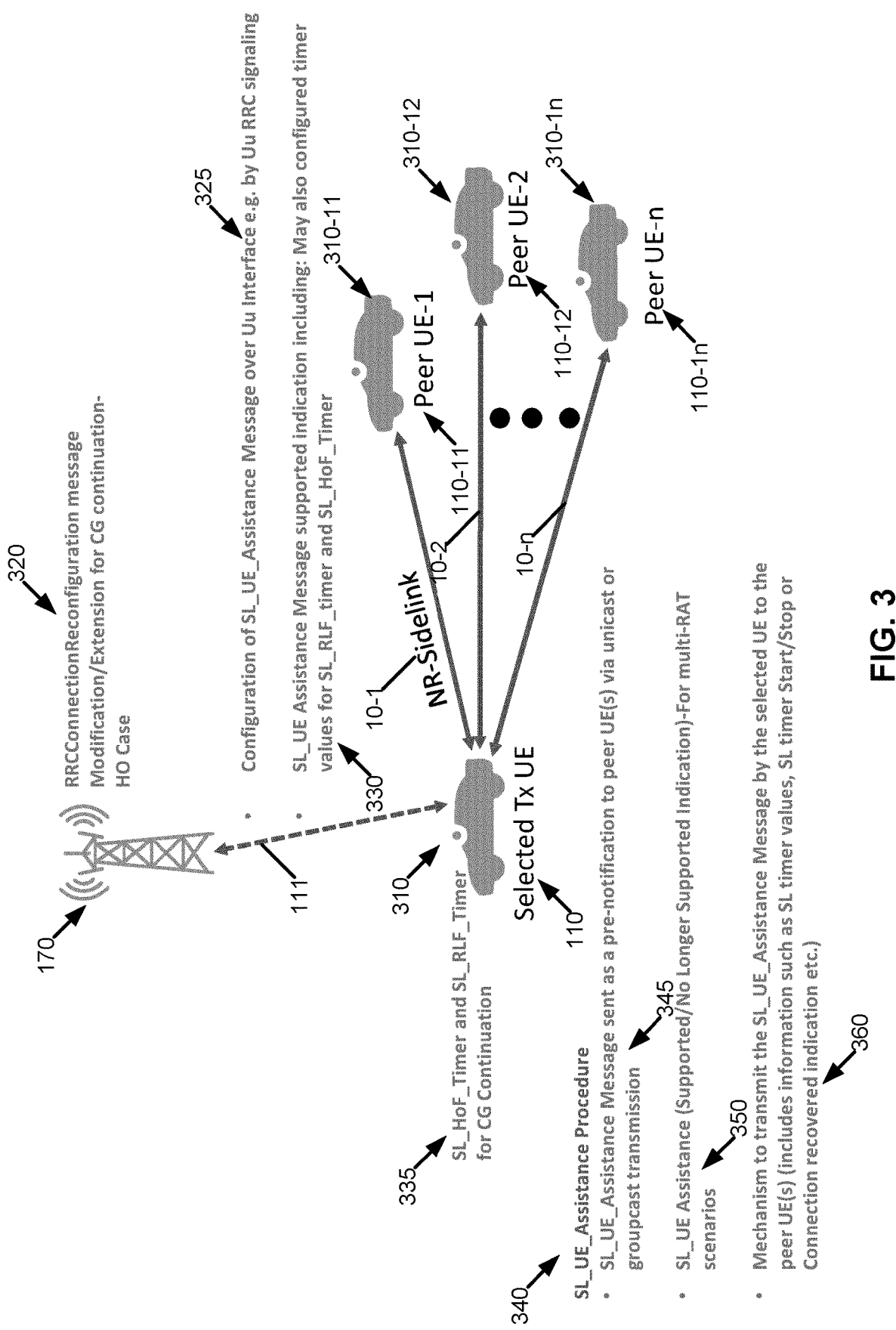
FIG. 3 is a high-level overview of an exemplary embodiment that illustrates certain exemplary features.

Turning to FIG. 3, this is a high-level overview that illustrates these certain exemplary features. FIG. 3 illustrates interactions between the gNB 170, a selected TX UE 110 in a vehicle 310, and n SL peer UEs UE-1 110-11, UE-2 110-12, ..., UE-n 110-1n, each SL peer UE 110-1 corresponding to respective vehicles 310-11, 310-12, ..., 310-1n. The UE 110 communicates with the n SL peer UEs UE-1 110-11, UE-2 110-12, ..., UE-n 110-1n via NR-sidelinks 10-1, 10-2, ..., 10-n.

Reference 320 indicates that the gNB 170 sends an RRCConnectionReconfiguration message with a modification/extension for CG continuation-HO cases. Reference 325 indicates that the gNB 170 performs configuration of the SL_UE_Assistance message over the Uu interface, e.g., by Uu RRC signaling. By "configured", it means that the base station provides a set of parameters which are used to form/configure the message. In more detail, The SL_UE_Assistance message can be configured via dedicated signaling (such as RRC signaling) just like other RRC configurations/messages with a set of parameters that the gNB provides and commands UE to use or transmit using those parameters/values. The potential set of parameters that can be used to configure SL_UE_Assistance message are stated below, as examples. The SL_UE_Assistance message can be used by the Tx UE 110 to communicate one or more of these parameters (values, state, and the like) to the SL peer UE(s) 110-1. This message is then transmitted over a medium (e.g., Uu interface, sidelink or wire, and the like). The gNB 170, in reference 330, uses the SL_UE_Assistance message with supported indications including, e.g., configured timer values for SL_RLF_Timer and SL_HoF_Timer. These references correspond in part to (a)-(d) above.

The selected TX UE 110 in reference 335 uses the SL_HoF_Timer and the SL_RLF_Timer for CG continuation. This corresponds at least to (c) above. The UE 110 also undertakes an assistance procedure, illustrated as reference 340 (SL_UE_Assistance Procedure), which includes references 345, 350, and 360. In reference 345, the UE 110 sends the SL_UE_Assistance message, which is sent as a pre-notification to the SL peer UE(s) 110-1 via unicast, groupcast, or broadcast transmission. As a point of clarification, the SL_UE_Assistance message is a kind of "pre-notification", which in principle informs the peer UE(s) 110-1 about the extension/continuation of CG for a fixed period of time and the potential possibility that eventually if the Tx UE is not able to recover, the Tx UE 110 will switch to exceptional pool resources. The UE 110 in reference 350 sends an SL_UE_Assistance indication such as Supported/No Longer Supported, for multi-RAT scenarios. In reference 360, the UE 110 implements a mechanism to transmit the SL_UE_Assistance message by the selected TX UE 110 to the peer UE(s) 110-1, which includes information such as SL timer value(s), SL timer Start/Stop, connection recovered indication, and the like.

It is worth noting that the proposed SL_UE_Assistance message mechanism remains valid irrespective of the method used to continue the configured grant in any triggering events, e.g., activation of 3GPP specified Uu Timers (T304/T310/T311, and the like) and HoF/RLF events.

Now that an overview has been provided, further details, which may be used for various implementations, are provided. Exemplary embodiments propose a mechanism in which a selected Tx UE 110 with CG in RRC_CONNECTED state is configured to pre-notify the SL peer UEs 110-1 (e.g., via a new message called the SL_UE_Assistance message in certain exemplary embodiments) if the UE 110 detects problems and experiences a situation where the CG could be lost, potentially causing QoS degradation. A new SL_UE_Assistance message is introduced in certain examples, where this message is a type of pre-notification message configured by, e.g., the network. In other examples, a mechanism is proposed to transmit this message to the SL peer UE(s) 110-1 via unicast/groupcast/broadcast transmission. The new SL_UE_Assistance message sent via unicast/groupcast/broadcast transmission may originate and terminate on SL SP (applied for at least LTE SL), SL RRC (applied for at least NR SL unicast) or PDCP (applied for both LTE SL and NR SL) level, e.g., to be as close to the application layer as possible for indicating the CG status and QoS KPIs/SLRB/Flows that might be affected. Other options based on SL RRC, MAC or L1 SCI signaling are also possible and may be considered.

The proposed SL_UE_Assistance message can be configured, e.g., by the gNB 170, e.g., via the RRCConnectionReconfiguration message, with several parameters such as (but not limited to) one or more of the following:

1) The type of initiated timers (new SL timers/T304/T310/T311) (to be indicated to the SL peer UEs 110-1).

2) Whether the UE 110 is configured to keep using CG when the UE's Uu timers (T304/T310/T311) start.

3) Whether the UE 110 is configured to use CG for a pre-defined time when the Tx UE changes its state from RRC_CONNECTED to RRC_IDLE/INACTIVE. Also, if there are any special conditions/cases under which the UE can keep using CG.

4) Duration of the pre-defined CG SL timer.

5) PC5 Flow Indicator (PFI), destination ID, cast type.

6) Triggering conditions to transmit the SL_UE_Assistance message to the SL peer UEs 110-1.

7) Whether the Tx UE is configured to use the exceptional pool or the default SLRB.

8) QoS Flow IDs or QoS Profiles/SLRB IDs of the flows whose QoS might be affected or QoS Flow IDs or QoS Profiles/SLRB IDs of QoS Sensitive applications.

9) The same message (the SL_UE_Assistance message) can be used to indicate when the UE has recovered to RRC_CONNECTED state and or when the RLF or HoF is not declared (i.e. as per different possible scenarios described above).

10) Indicate when timers are stopped and RRC connection is not lost.

11) The duration of the proposed SL Timers (SL_HoF/RLF Timers) if any and/or Uu RRC timer values if required.

12) Selected SLRB parameters (if needed or configured).

13) Any other related parameter (mode type, resource allocation information).

14) PCI (ID) from gNB, which is controlling the UE on Uu interface (to make other following SL peer UEs aware about possible RLF problems).

15) UE Location, default SLRB as per cast type, and the like.

The SL_UE_Assistance message can be transmitted to the SL peer UEs using L1, L2 or L3 signaling or a combination of L1/L2/L3 signaling. The selected/Tx UE 110 may decide to couple or decouple the transmission of SL_UE_Assistance message with the ongoing unicast/groupcast/broadcast link. The UE 110 may aim to utilize the ongoing established SL as much as possible. The composition of the SL_UE_Assistance message can be configured by the network together with SLRB configuration or independently (e.g., this can be a sub-use for the Uu interface).

The SL_UE_Assistance message can be configured for either all unicast/groupcast/broadcast SLRBs or, based on QoS profile policies, only targeted unicast/groupcast/broadcast UEs can be selected. The SL_UE_Assistance message may be sent with or without the feedback control.

Based on the cast type of the transmission (unicast/groupcast/broadcast), the selected UE 110 may send the SL_UE_Assistance message via several methods, for e.g., individual SL PDCP C-PDUs according to the configured traffic pattern of the targeted QoS flow may be coupled with the actual data sent on the targeted QoS flow and RB service.

In case of unicast transmissions, the selected UE 110 may generate and send, e.g., individual SL SP (applied for at least LTE SL) or SL RRC (applied for at least NR SL) messages for the targeted RB service according to the configured traffic pattern of the targeted QoS flow, like SL PDCP PDUs above.

In case of HARQ and/or ARQ or any other feedback control mechanism may be adopted for the established unicast/groupcast/broadcast SL.

Depending on whether the SL_UE_Assistance message can be coupled with actual data, a mix of L1, L2 or L3 signaling options may also be considered to transmit the SL_UE_Assistance message in order to reduce overhead. This also depends on how frequently the UE sends the SL_UE_Assistance message and the cast type of the transmission. For example, in case if the SL_UE_Assistance message transmit timing matches the transmission timing of an ongoing data transmission that is frequently sent, then the transmission of SL_UE_Assistance message can be coupled with the actual data and the L1 option may be used. Similarly, if SL_UE_Assistance message is triggered and there is a data transmission scheduled, the SL_UE_Assistance message can be coupled with the scheduled data transmission. Otherwise an L2 or L3 option maybe used.

Figure 4:
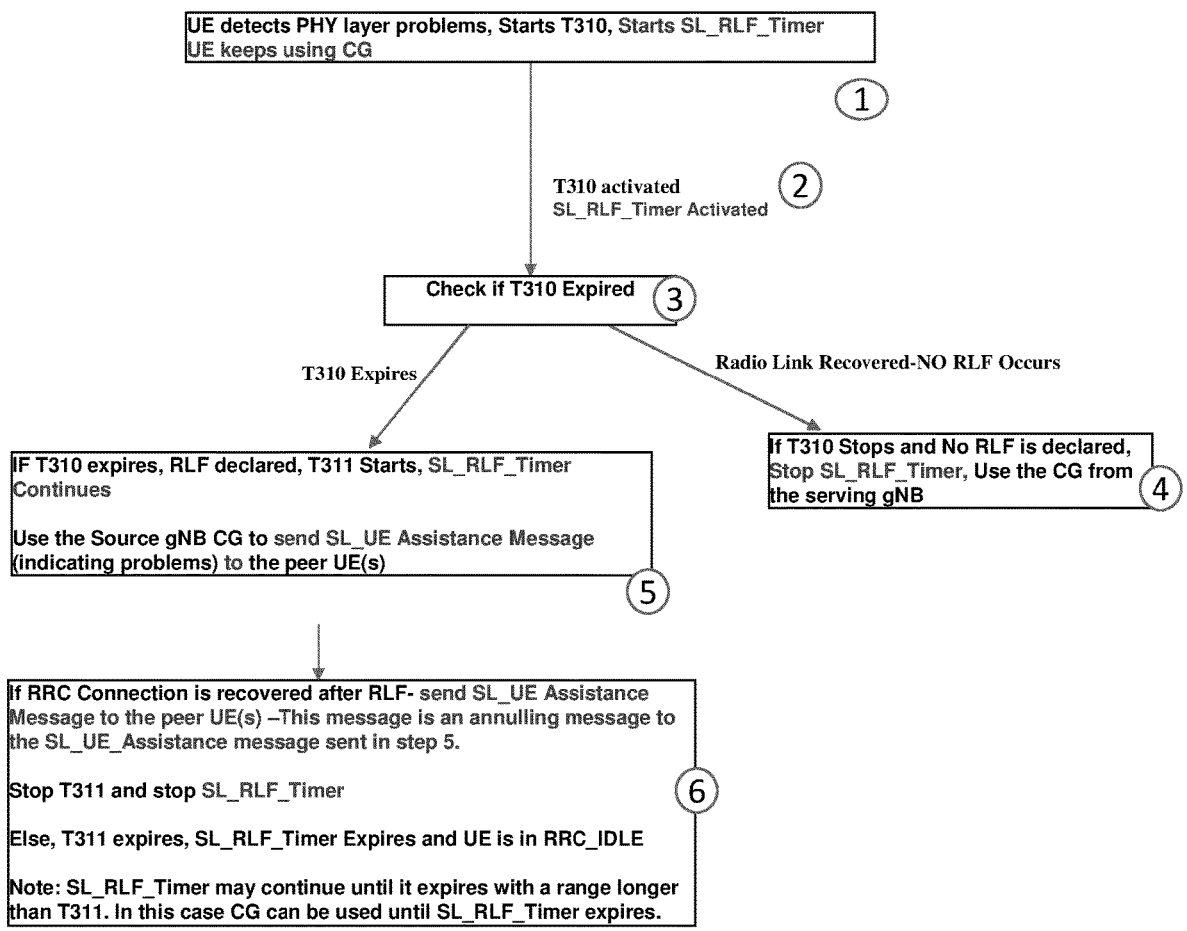
FIG. 4 is a block diagram of flowchart of a first radio link failure solution ("solution-1") in an exemplary embodiment.
Figure 5:
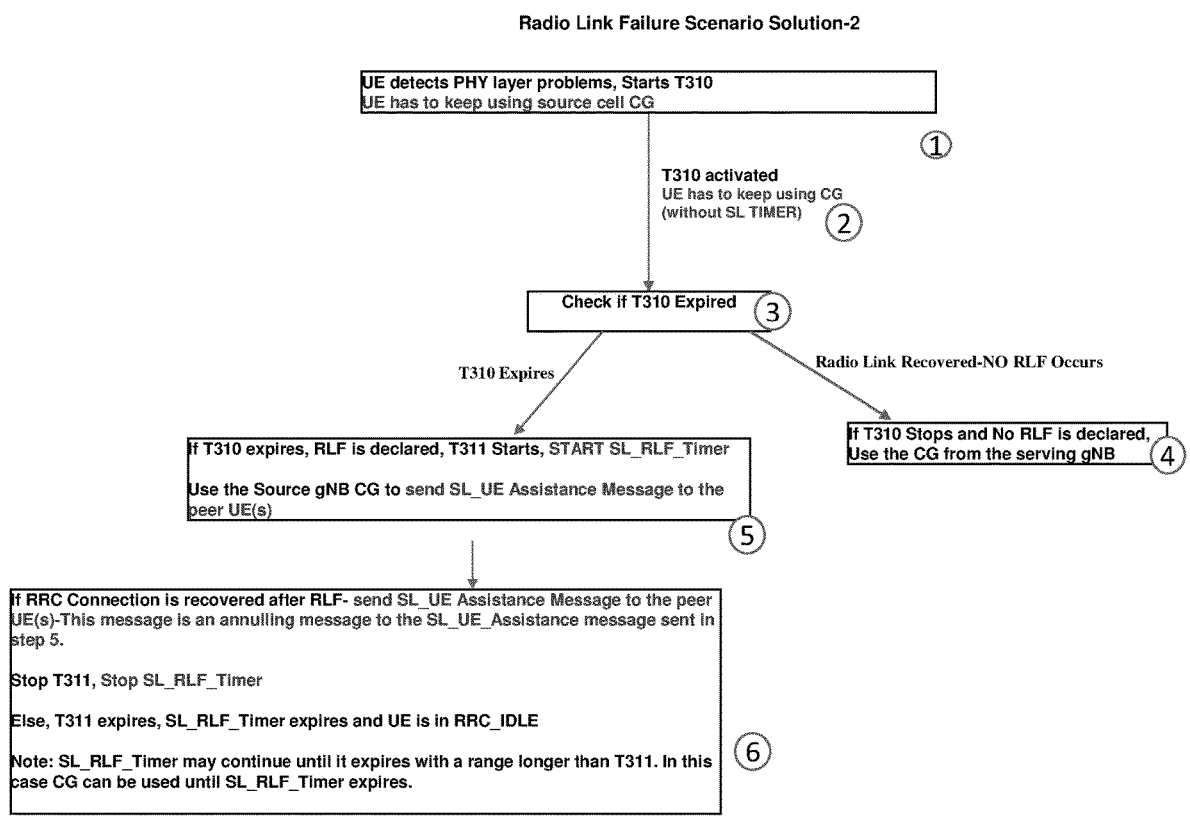
FIG. 5 is a block diagram of flowchart of a second radio link failure solution ("solution-2") in another exemplary embodiment.

Two solutions of the RLF case are provided as examples. These are illustrated in FIGS. 4 and 5. These figures illustrate the operation of exemplary methods, a result of execution of computer program instructions embodied on a computer readable memory, functions performed by logic implemented in hardware, and/or interconnected means for performing functions in accordance with exemplary embodiments. These figures are assumed to be performed by the UE 110, e.g., under control of the control module 140.

Referring to FIG. 4, this figure is a block diagram of flowchart of a first radio link failure solution ("solution-1"). In block (1), the UE 110 detects PHY layer problems, and in response starts timers T310 and SL_RLF_Timer. The UE 110 also keeps using the CG.

In (2), the timers T310 and SL_RLF_Timer are activated and running. The UE 110 keeps using the CG, while in conventional systems, the SL_UE 110 should use exceptional pools as soon as the T310 timer starts. That would mean that the QoS over SL may degrade, as the UEs 110-1 are no longer able to use CG.

For block (3), the UE checks the RLF status, i.e. if the timer T310 is stopped and the UE has recovered from the detected problems or if the timer T310 is expired. If no Radio Link Failure (RLF) occurs (see (4)), the UE 110 stops the timer T310 and the timer SL_RLF_Timer, and the UE continues to operate via standard procedures.

By contrast, if the timer T310 expires (see block (5)), and RLF is declared, then the UE 110 starts the timer T311, continues the timer SL_RLF_Timer, and the UE 110 sends SL_UE_Assistance Message (using source cell CG) to SL peer UE(s) 110-1 indicating problems and information related to extended CG with limited availability.

With respect to block (6), if the RRC Connection is recovered while timer T311 is running, the SL_UE_Assistance message is re-sent (e.g., using source cell CG) to inform the SL peer UE(s) 110-that the source Tx UE 110 has recovered from problems. This message is an annulling message to the SL_UE_Assistance message sent in block (5). The SL_RLF_Timer is stopped by the UE 110.

Alternatively, if the RRC Connection is not recovered, the timer T311 is expired and the UE 110 attains RRC_IDLE status. If the SL_RLF_Timer is configured to be longer than T311, the UE can keep using CG even when UE is in the RRC_IDLE/INACTIVE state. This can provide the AS layer additional time to respond when the UE goes in the RRC_IDLE state.

Turning to FIG. 5, this figure is a block diagram of flowchart of a second radio link failure solution ("solution-2"). For block (1), the UE 110 detects PHY layer problems, and the timer T310 is started by the UE. The UE 110 keeps using source cell CG.

As indicated by (2), the timer T310 is activated by the UE, and in block (3), the UE checks the RLF status. That is, if the timer T310 is stopped and if the UE has recovered from the detected problems, or if the timer T310 is expired.

In block (4), if no Radio Link Failure (RLF) occurs, the UE 110 stops the timer T310, and the UE continues to operate via standard procedures (e.g., using the CG from the serving gNB). On the other hand, if the timer T310 expires as in block (5), and an RLF is declared by the UE, the UE 110 starts the timer T311, starts the SL_RLF_Timer, and sends a SL_UE_Assistance Message (using source cell CG) to SL peer UE(s) 110-1 indicating problems and information related to extended CG with limited availability.

In block (6), if the RRC connection is recovered while the timer T311 is running, the SL_UE_Assistance message is re-sent (using source cell CG) to inform the SL peer UE(s) that the source UE has recovered from problems. This message is an annulling message to the SL_UE_Assistance message sent in block 5. The SL_RLF_Timer is stopped by the UE 110.

Alternatively, if the RRC Connection is not recovered, the timer T311 is expired and UE attains RRC_IDLE status. If the SL_RLF_Timer is configured to be longer than T311, the UE can keep using CG. This can provide the AS layer additional time to respond (until the SL_RLF_Timer is expired) when the UE goes in RRC_IDLE/INACTIVE state.

Figure 6:
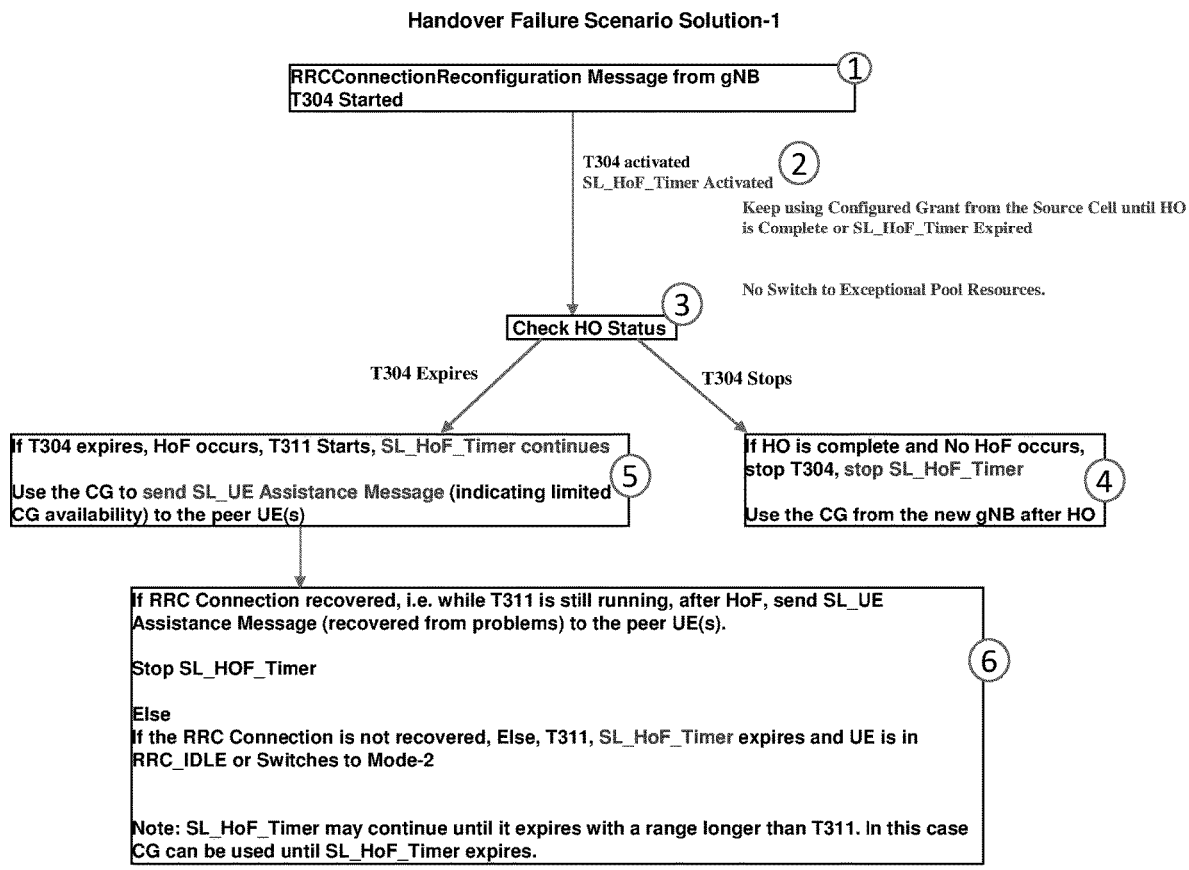
FIG. 6 is a block diagram of flowchart of a first handover process/potential HO failure handover failure solution ("solution-1") in another exemplary embodiment.
Figure 7:
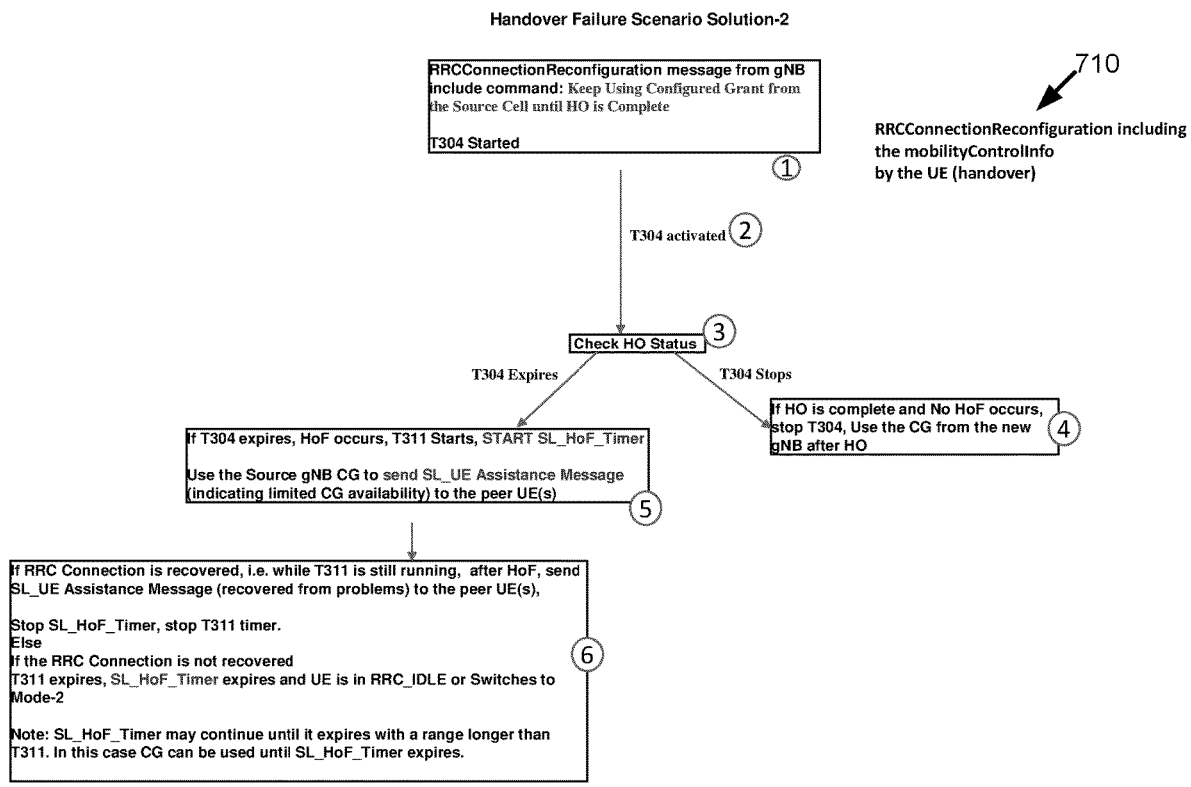
FIG. 7 is a block diagram of flowchart of a second handover process/potential HO failure solution ("solution-2") in another exemplary embodiment.

FIGS. 6 and 7 illustrate two exemplary solutions of the HoF case. These figures illustrate the operation of exemplary methods, a result of execution of computer program instructions embodied on a computer readable memory, functions performed by logic implemented in hardware, and/or interconnected means for performing functions in accordance with exemplary embodiments. These figures are assumed to be performed by the UE 110, e.g., under control of the control module 140.

It is noted that, in case of Handover, for solutions 1 and 2, it is assumed that either a CG or no CG from the target gNB is provided in the HO command. This is the assumption for FIGS. 6 (solution 1) and 7 (solution 2).

Turning to FIG. 6, this figure is a block diagram of flowchart of a first handover process/potential HO failure solution ("solution-1"). In block (1), the UE 110 receives a RRCConnectionReconfiguration message from the gNB which might include a CG from the target gNB. The UE 110 in response and in reference (2), starts the timer T304 and the timer SL_HoF_Timer. The T304 timer is specified in the 3GPP specifications but SL_HoF_Timer is a part of an exemplary solution herein. The SL_HoF_Timer enables the SL Tx UE 110 to keep using configured grant until the HO is complete (i.e., RACH and synchronization to the target gNB 170-1 is finalized and a switch to the new CG—provided in the RRCConnectionReconfiguration message or during synchronization to the target gNB—occurs) or the SL_HoF_Timer expires.

In block (3), the UE 110 checks the HO status, i.e., if the timer T304 is stopped and the HO is complete or if the timer T304 is expired. If in block (4) the HO is complete (RACH and synchronization to the target gNB is finalized), i.e. no handover failure (HoF) occurred, T304 and SL_HoF timer are stopped by the UE 110 and the UE 110 starts using the CG from the target gNB. By contrast, in block (5), if T304 expires and HoF occurs, the UE starts timer T311, the UE allows the SL_HoF timer to continue, and the UE 110 sends SL_UE_Assistance message (using source cell CG) to SL peer UE(s) indicating problems.

In block (6), while timer T311 is running, if the RRC connection is recovered, the SL_UE_Assistance message is re-sent to inform the SL peer UE(s) 110-1 that the source UE 110 has recovered from problems. This message is an annulling message to the SL_UE_Assistance message sent in block (5). The SL_HoF_Timer is stopped by the UE 110.

Alternatively, if the RRC Connection is not recovered, the timer T311 is expired and the UE attains RRC_IDLE status. If the SL_HoF_Timer is configured to be longer than T311, the UE 110 can still keep using CG. This can provide the AS layer additional time to respond when the UE goes into the RRC_IDLE state.

Referring to FIG. 7, this figure is a block diagram of flowchart of a second handover process/potential HO failure solution ("solution-2"). In block (1), the UE receives an Extended/Modified RRCConnectionReconfiguration Message from the gNB, the message includes the command to keep using source cell CG when T304 is activated. As reference 710 illustrates, the RRCConnectionReconfiguration message includes the mobilityControlInfo by the UE for handover.

In block (2), the UE 110 starts timer T304 and the Tx UE 110 keeps using configured grant until the HO is complete (i.e., RACH and synchronization to the target gNB 170).

In block (3), the UE 110 checks the HO status, i.e., if the timer T304 is stopped and the HO is complete, or if the timer T304 is expired. If the HO is complete and no handover failure (HoF) occurs (see block (4)), the UE 110 stops T304 and the UE 110 uses the CG from the target gNB after HO. If, however, T304 expires and HoF occurs (see block (5)), the UE 110 starts timer T311 and the UE starts (e.g., simultaneously) the SL_HoF Timer, and the UE sends an SL_UE_Assistance message (using source cell CG) to SL peer UE(s) 110-1 indicating problems.

In block (6), while T311 is running and the RRC connection is recovered, the SL_UE_Assistance message is re-sent (using source cell CG) by the UE 110 to inform the SL peer UE(s) 110-1 that the UE 110 has recovered from problems. This message is an annulling message to the SL_UE_Assistance message sent in block (5). The SL_HoF Timer is stopped by the UE 110. Otherwise, if the RRC connection is not recovered, T311 expires, the SL_HoF_Timer expires, and the UE 110 is in RRC_IDLE mode or switches to Mode-2. It is noted that the SL_HoF_Timer may continue until it expires with a range longer than T311. In the case, the CG can be used until the SL_HoF_Timer expires. This can provide the AS layer additional time to respond when the UE goes in RRC_IDLE/INACTIVE state.

In a further embodiment, the SL peer UE 110-1 is already informed during normal Uu operation if SL_UE_Assistance message is supported and will be sent upon any upcoming link event. This may be useful if not all UEs or not all gNBs support the proposed mechanism. In particular, this is important for multi-RAT scenarios where a particular RAT may or may not support CG continuation and advanced notification mechanism. Knowledge about the support may allow an application to be more progressive because the application can expect an early warning in advance, before the SL communication may fail.

In this embodiment, the SL TX UE 110 sends a first SL_UE Assistance message to the RX-UE 110-1 at connection setup or when the SL TX UE 110 enters a cell of a gNB 170-1 that supports the proposed mechanisms, announcing that SL issues will be indicated. The indication may include the values and related information of the SL_HoF_Timer and SL_RLF_Timer. The application can use this knowledge to operate in a way that is more sensitive to QoS degradations.

This may also operate in a vice versa manner, where the TX UE 110 should inform the SL peer UE 110-1 that SL_UE_Assistance message is no longer supported (e.g., for multi-RAT scenarios). This can occur when the UE 110 changes to a gNB or network area where this service is not supported or when the UE experiences a handover into a RAT that does not support SL_UE_Assistance message (e.g., SL_UE_Assistance Message is specified for 5G SL but not for LTE V2X SL). Such information would inform the application in the Rx UE that from now on SL interruptions can occur without an advanced warning message and without a SL HO/RLF_Timer grace period.

For FIGS. 4-7, the SL UE assistance message is sent in response to a Uu timer expiring and a specific condition occurring: FIGS. 4 and 5 have the timer T310 expiring and a RLF being declared, and in response the SL UE assistance message is sent; and FIGS. 6 and 7 have the timer T304 expiring and an HoF being declared, and in response the SL UE assistance message is sent. This timing, however, need not be as such. For example, the SL_UE_Assistance message can be sent over the sidelink 10 from the TX UE 110 to the SL peer UEs 110-1 in response to the T304/T310 being triggered or any time while T304/T310 is running. For illustration, the SL_UE_Assistance message could be sent after a time of T304/T310-X ms (e.g., the timer value minus "X" milliseconds). Or any other similar trigger may be used for sending this message to the peer UEs.

Figure 8:
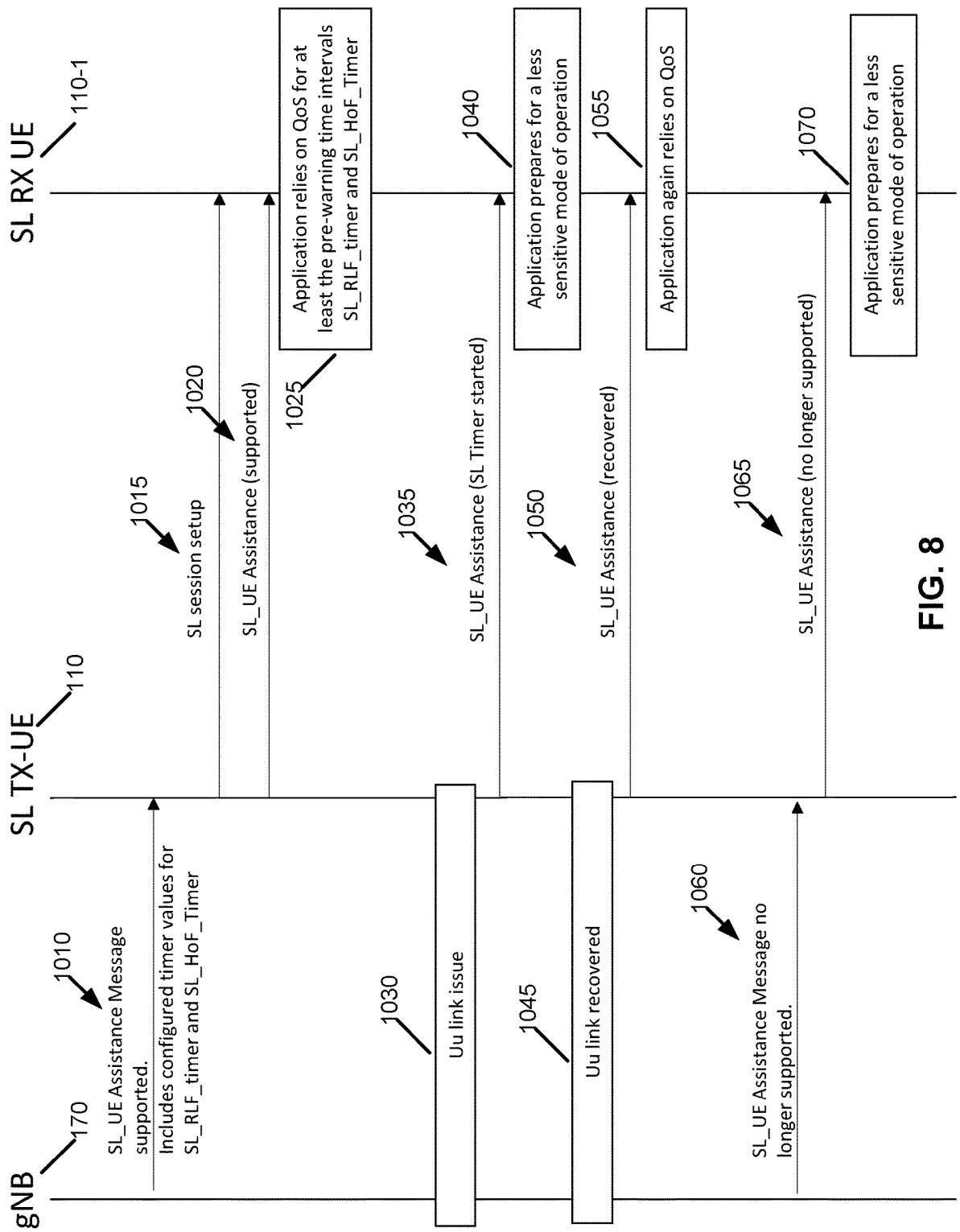
FIG. 8 is signaling diagram of a SL UE assistance message sequence including the proceeding optional SL_UE_Assistance indication in another exemplary embodiment.

FIG. 8 is signaling diagram of a SL_UE assistance message sequence including the proceeding optional SL_UE_Assistance indication. In signaling 1010, the gNB 170 sends a SL_UE_Assistance message, indicating the SL_UE_Assistance is supported, and also which includes configured timer values for SL_RLF_Timer and SL_HoF_Timer. For instance, a parameter of the message could indicate the support. This bit of information may be set in following messages to the SL peer UE, except in a message indicating end of support. The SL TX UE 110, in response, sends an SL session setup message in signaling 1015 and an SL_UE_Assistance message indicting that the Assistance is supported in signaling 1020. These are sent to the SL TX UE 110-1, via the SL 10. In block 1025, the SL RX UE 110-1 has an application that relies on QoS for at least the pre-warning timer intervals SL_RLF_Timer and the SL_HoF_Timer. Pre-warning in this context means that a SL_UE_Assistance message will be sent with a timer to indicate upcoming SL issues. This grace period was called uncertainty period above.

In block 1030, the SL TX UE 110 determines there is a Uu link issue (e.g., as might the gNB 170), and in response, the UE 110 sends an SL_UE_Assistance message indicating the SL Timer is started in signaling 1035. The SL RX UE 110 in block 1040 has its application prepare for a less sensitive mode of operation. As examples of less sensitive modes of operation, consider the following: driving distance in a platoon is increased to a more secure distance; a joint maneuver like lane merging is terminated because it would be too dangerous to continue when facing a SL interruption; in a factory scenario with closed loop motion control, it could mean that an industrial robot is slowing down or moving into a safe position until the QoS issues of the SL connectivity are recovered. Other examples are also possible.

In block 1045, the Uu link is recovered, and the UE 110 in response sends an SL_UE_Assistance message with an indication of "recovered" in signaling 1050. The application in the UE 110-1 again relies on QoS (e.g., the application returns to a normal mode of operation). See block 1055.

In signaling 1060, the gNB 170 sends a message that SL_UE Assistance is not supported, i.e., SL_RLF_Timer and SL_HoF_Timer timers cannot be used to extend CGs in case of Uu link issues. This can be, e.g., a dedicated message to the SL TX UE or the message can be sent as system information or broadcasted to all RX UEs 110-1 that have selected this gNB 170.

In signaling 1065, the SL TX UE 110 sends an SL_UE_Assistance message indicating that UE assistance is no longer supported. The application at the SL RX UE 110-1 prepares in block 1070 for a less sensitive mode of operation.

In some embodiments, the SL_UE_Assistance messages are sent with Ack mode or HARQ, i.e., with feedback control enabled. This is recommended because, in case of a recovery, the loss of the annulation message would leave the SL peer UE under the impression that QoS degradation is to be expected after the expiry of the proposed SL timer. In this case the application would prepare for the QoS degradation and switch to a more fail-safe mode of operation, i.e., the application experience might be worse that without the proposed mechanisms described herein.

Figure 9:
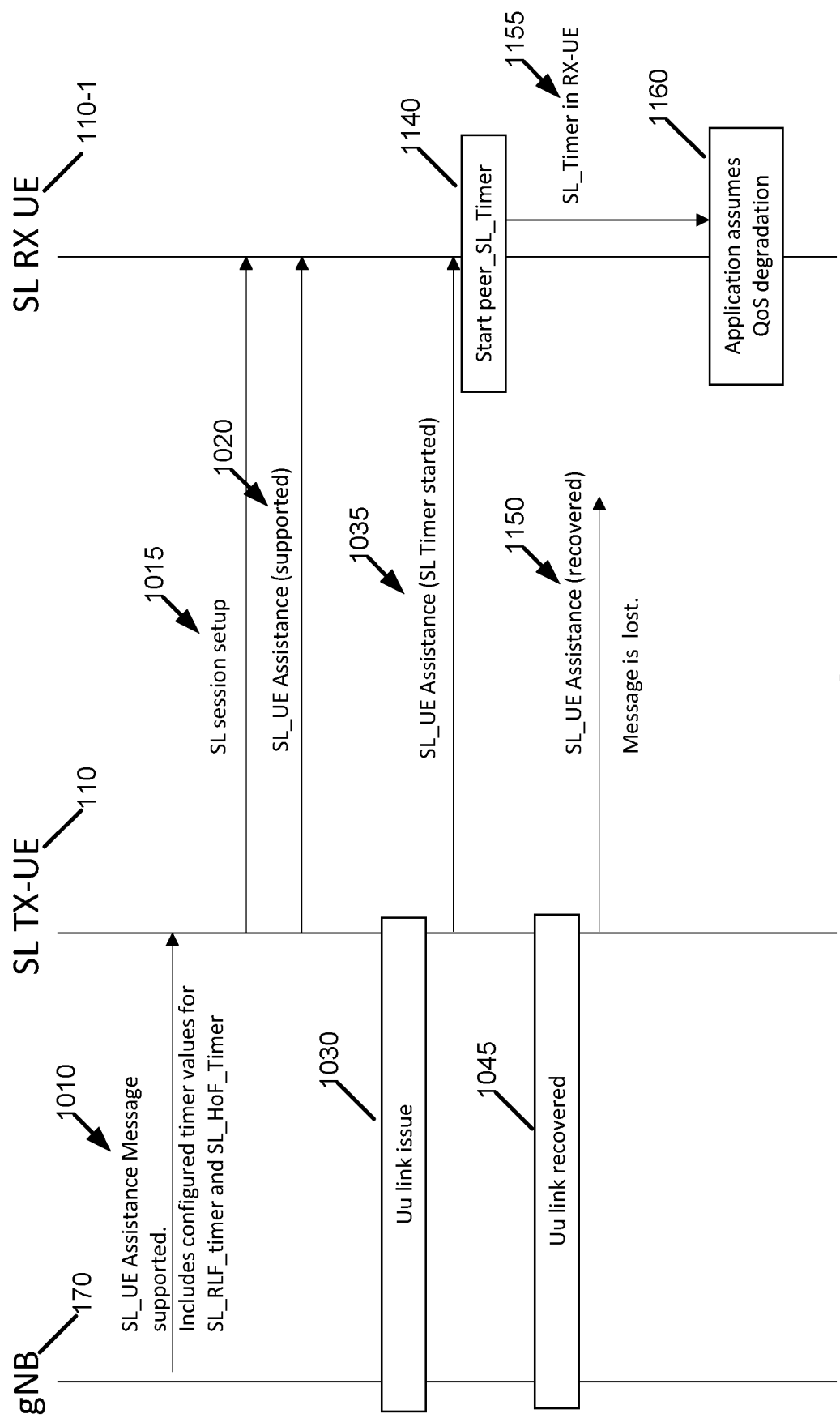
FIG. 9 is a signaling diagram of a failure case in a non-Ack mode with a lost recovery message in another exemplary embodiment.

Referring to FIG. 9, this figure is a signaling diagram of a failure case in a non-Ack mode with a lost recovery message. The signaling 1010, 1015, 1020, 1030, and 1035 are the same as in FIG. 8. In block 1140, the SL RX UE 110-1 starts a peer SL_Timer. This illustrates that with the peer SL_Timer, the SL RX UE 110-1 expects that after expiration of the peer SL timer messages from the SL TX UE may be delayed or lost, e.g. because of lack of resources in the exceptional pool. This is because after the Uu link is recovered in block 1045 and the SL TX UE 110 sends the SL_UE_Assistance message in signaling 1150 with an indication of "recovered", this message is lost. Using the SL_Timer that is running 1155, the UE 110-1 can determine in block 1160 that the SL_Timer has expired (e.g., or met some set time value) and the application assumes QoS degradation.

The following are additional examples.

Example 1. A method, comprising:
for a user equipment in a wireless network and able to communicate via sidelink communications with one or more other user equipment, determining by the user equipment whether a specific condition exists indicating the user equipment has limited availability of configured grant resources used to communicate for the sidelink communications; and
sending, by the user equipment and using the sidelink communications, a message indicating the limited availability of the configured grant resources toward the one or more other user equipment.

Example 2. The method of example 1, wherein sending is performed by the user equipment via unicast, groupcast, or broadcast to the one or more other user equipment.

Example 3. The method of any of examples 1 or 2, wherein the user equipment continues to use, for a fixed time duration that begins after the determination the specific condition exists, the configured grant resources to communicate using the sidelink communications with the one or more other user equipment.

Example 4. The method of any of examples 1 to 3, wherein:
the specific condition is a detection of a physical layer problem; and
the method comprises the user equipment starting a first timer in response to the detection, the first timer indicating time until a radio link failure is declared.

Example 5. The method of example 4, wherein the sending of the message indicating the limited availability of the configured grant resources is performed by the user equipment any time after starting the first timer.

Example 6. The method of example 5, wherein, in response to the first timer expiring and the user equipment declaring a radio link failure, the user equipment performs the sending of the message indicating the limited availability of the configured grant resources.

Example 7. The method of any of examples 4 to 6, further comprising, in response to a radio resource control connection being recovered after the radio link failure being declared, sending by the user equipment a second message to the one or more other user equipment indicating that the message indicating the limited availability of the configured grant resources is annulled.

Example 8. The method of example 7, further comprising starting, in response to detection of a physical layer problem, by the user equipment a second timer indicating the fixed time duration.

Example 9. The method of example 7, further comprising starting, in response to the first timer expiring and the user equipment declaring a radio link failure, by the user equipment a second timer indicating the fixed time duration.

Example 10. The method of any of examples 8 or 9, further comprising the user equipment setting, in response to the first timer expiring and the user equipment declaring a radio link failure, a third timer, and wherein method comprises the user equipment transitioning to idle mode in response to the third timer expiring, but wherein the user equipment continues to use the configured grant resources to communicate using the sidelink communications with the one or more other user equipment until the second timer expires.

Example 11. The method of example 10, wherein the second timer has a range longer than the third timer, and the user equipment uses the configured grant resources to communicate using the sidelink communications with the one or more other user equipment after the third timer has expired.

Example 12. The method of any of examples 1 to 3, wherein:
the specific condition is a detection of a handover command; and
the method comprises the user equipment starting a first timer in response to the detection, the first timer indicating time until a handover failure is declared.

Example 13. The method of example 12, wherein the sending of the message indicating the limited availability of the configured grant resources is performed by the user equipment any time after starting the first timer.

Example 14. The method of example 13, wherein, in response to the first timer expiring and the user equipment declaring a handover failure, the user equipment performs the sending of the message indicating the limited availability of the configured grant resources.

Example 15. The method of any of examples 12 to 14, further comprising, in response to a radio resource control connection being recovered after the handover failure being declared, sending by the user equipment a second message to the one or more other user equipment indicating that the message indicating the limited availability of the configured grant resources is annulled.

Example 16. The method of example 15, further comprising starting, in response to detection of the handover command, by the user equipment a second timer indicating the fixed time duration.

Example 17. The method of example 15, further comprising starting, in response to the first timer expiring and the user equipment declaring the handover failure, by the user equipment a second timer indicating the fixed time duration.

Example 18. The method of any of examples 16 or 17, further comprising the user equipment setting, in response to the first timer expiring and the user equipment declaring a handover failure, a third timer, and wherein method comprises the user equipment transitioning to idle mode in response to the third timer expiring, but wherein the user equipment continues to use the configured grant resources to communicate using the sidelink communications with the one or more other user equipment until the second timer expires.

Example 19. The method of example 18, wherein the second timer has a range longer than the third timer, and the user equipment uses the configured grant resources to communicate using the sidelink communications with the one or more other user equipment after the third timer has expired.

Example 20. The method of any of examples 1 to 19, wherein the message indicating the limited availability of the configured grant resources has been configured by the wireless network prior to the user equipment sending the message using the sidelink communications toward the one or more other user equipment.

Example 21. The method of any of examples 1 to 20, further comprising the user equipment sending an indication, intended for a base station in the wireless network to alert the base station of transmission state of the user equipment, to the one or more other user equipment on request of the user equipment in response to the user equipment being about to change its radio resource control connection status to RRC_IDLE.

Example 22. The method of any of examples 1 to 21, further comprising one or more of the following:
based on a cast type of a transmission used to send the message indicating the limited availability of the configured grant resources, sending by the user equipment the message via several methods, comprising one or more of individual sidelink packet data convergence protocol control-protocol data units according to a configured traffic pattern of a targeted quality of service flow, or a message combined with data sent on targeted quality of service flow and a targeted radio bearer service;
in case of unicast transmission as the cast type, generating and sending, by the user equipment, individual sidelink signaling protocol or sidelink radio resource control messages for the targeted radio bearer service according to the configured traffic pattern of the quality of service flow;
in case of hybrid automatic repeat request and/or automatic repeat request and/or other feedback control mechanism, adopting by the user equipment a corresponding feedback control mechanism for established sidelink communication; or
depending on whether the message indicating the limited availability of the configured grant resources can be coupled with data, using by the user equipment a mix of one or more of layers L1, L2 or L3 signaling options to transmit the message.

Example 23. A method, comprising:
receiving, from a user equipment and at another user equipment using sidelink communications in a wireless network, a message indicating a limited availability of configured grant resources for the user equipment; and
preparing, by the other user equipment, an application in the other user equipment for a less sensitive mode of operation having less quality of service than a mode having a normal quality of service.

Example 24. The method of example 23, further comprising:
receiving, prior to receiving the message, a second message indicating the user equipment supports pre-notification and configured grant continuation functionality wherein the user equipment will send the message to the other user equipment in response to the user equipment determining there is a limited availability of configured grant resources for the user equipment; and
causing, by the user equipment in response to receiving the second message, the application in the other user equipment to rely on a normal quality of service at least until the message indicating a limited availability of configured grant resources for the user equipment is received.

Example 25. The method of example 23 or 24, further comprising:
receiving a message indicating the user equipment has determined the first message is annulled so there is no longer a limited availability of configured grant resources for the user equipment; and
causing, by the other user equipment and in response to message indicating the user equipment has determined the first message is annulled so there is no longer a limited availability of configured grant resources for the user equipment, the application in the other user equipment to transition from the less sensitive mode of operation to a mode of operation having the normal quality of service.

Example 26. The method of any of examples 23 to 25, further comprising the other user equipment receiving from the user equipment and using sidelink communications an indication, intended for a base station in the wireless network to alert the base station of transmission state or connection status or both of the user equipment, and sending by the other user equipment the indication toward the base station.

Example 27. A method, comprising
at a base station in a wireless network, configuring a user equipment with configured grant resources used to communicate between the user equipment and one or more other user equipment for sidelink communications; and
providing, by the base station and using radio resource control procedures, a set of parameters to the user equipment, the set of parameters to be used by the user equipment to form a message for the user equipment to transmit to the one or more other user equipment using sidelink communications, the message indicating to the one or more other user equipment that the user equipment has limited availability of the configured grant resources for the sidelink communications.

Example 28. The method of example 27, wherein the set of parameters comprise one or more of the following:
a type of initiated timers to be indicated to the one or more user equipment;
an indication of whether the user equipment is configured to keep using the configured grant resources in response to certain timers starting;
an indication of whether the user equipment is configured to use the configured grant resources for a pre-defined time in response to the user equipment changing its state from RRC_CONNECTED to RRC_IDLE or RRC_INACTIVE.
an indication of any special conditions under which the user equipment can keep using the configured grant resources;
an indication of a duration of a pre-defined configured grant sidelink timer;
indication of one or more of PC5 Flow Indicator (PFI), destination identification (ID), or cast type;
indication of triggering conditions to transmit the message to the one or more other user equipment;
an indication of whether the user equipment is configured to use an exceptional pool of resources or a default sidelink radio bearer;
indication of quality of service flow identifications or quality of service profiles or sidelink radio bearer identifications of flows whose quality of service might be affected or quality of service flow identifications or quality of service profiles or sidelink radio bearer identifications of quality of service sensitive applications;
an indication of whether the user equipment has recovered to an RRC_CONNECTED state and or when a radio link failure or handover failure is not declared;
indication of when timers are stopped and radio resource control connection is not lost;
indication of a duration of sidelink timers for handover or radio link failure, if any, and/or radio resource controls timer values if required;
indication of selected sidelink radio bearer parameters, if needed or configured;
indications of any other related parameter, comprising one or more of mode type, or resource allocation information;
indication of a physical cell identifier from the base station, which is controlling the user equipment using a Uu interface;
indication of a location for the user equipment;
indication of a default physical cell identifier as per cast type; or
indication of a Uu radio resource control procedure to configure new sidelink timers.

Example 29. The method of any of examples 27 or 28, further comprising the base station configuring, via radio resource control or broadcast signaling, the user equipment to support or not to support advanced-notification and configured grant continuation functionality for a multi-radio access technology scenario.

Example 30. The method of any of examples 27 to 29, wherein the base station sends the message to the user equipment and the message indicates support/no-support of pre-notification and configured grant continuation functionality for multi-RAT scenario, and the base station expects the user equipment to send the message to the one or more other user equipment using sidelink communications.

Example 31. The method of any of examples 27 to 29, wherein the base station also sends the message to the one or more other user equipment via dedicated, groupcast or broadcast signaling.

Example 32. A computer program, comprising code for performing the methods of any of examples 1 to 31, when the computer program is run on a computer.

Example 33. The computer program according to example 32, wherein the computer program is a computer program product comprising a computer-readable medium bearing computer program code embodied therein for use with the computer.

Example 34. The computer program according to example 32, wherein the computer program is directly loadable into an internal memory of the computer.

Example 35. An apparatus, comprising:
one or more processors; and
one or more memories including computer program code, wherein the one or more memories and the computer program code are configured, with the one or more processors, to cause the apparatus to perform operations comprising:
for a user equipment in a wireless network and able to communicate via sidelink communications with one or more other user equipment, determining by the user equipment whether a specific condition exists indicating the user equipment has limited availability of configured grant resources used to communicate for the sidelink communications; and
sending, by the user equipment and using the sidelink communications, a message indicating the limited availability of the configured grant resources toward the one or more other user equipment.

Example 36. The apparatus of example 35, wherein the one or more memories and the computer program code are further configured, with the one or more processors, to cause the apparatus to perform operations to perform the method of any of examples 2 to 22.

Example 37. An apparatus, comprising:
one or more processors; and
one or more memories including computer program code, wherein the one or more memories and the computer program code are configured, with the one or more processors, to cause the apparatus to perform operations comprising:
receiving, from a user equipment and at another user equipment using sidelink communications in a wireless network, a message indicating a limited availability of configured grant resources for the user equipment; and
preparing, by the other user equipment, an application in the other user equipment for a less sensitive mode of operation having less quality of service than a mode having a normal quality of service.

Example 38. The apparatus of example 37, wherein the one or more memories and the computer program code are further configured, with the one or more processors, to cause the apparatus to perform operations to perform the method of any of examples 24 to 26.

Example 39. An apparatus, comprising:
one or more processors; and
one or more memories including computer program code, wherein the one or more memories and the computer program code are configured, with the one or more processors, to cause the apparatus to perform operations comprising:
at a base station in a wireless network, configuring a user equipment with configured grant resources used to communicate between the user equipment and one or more other user equipment for sidelink communications; and
providing, by the base station and using radio resource control procedures, a set of parameters to the user equipment, the set of parameters to be used by the user equipment to form a message for the user equipment to transmit to the one or more other user equipment using sidelink communications, the message indicating to the one or more other user equipment that the user equipment has limited availability of the configured grant resources for the sidelink communications.

Example 40. The apparatus of example 39, wherein the one or more memories and the computer program code are further configured, with the one or more processors, to cause the apparatus to perform operations to perform the method of any of examples 28 to 31.

Example 41. An apparatus, comprising:
means, for a user equipment in a wireless network and able to communicate via sidelink communications with one or more other user equipment, for determining by the user equipment whether a specific condition exists indicating the user equipment has limited availability of configured grant resources used to communicate for the sidelink communications; and
means for sending, by the user equipment and using the sidelink communications, a message indicating the limited availability of the configured grant resources toward the one or more other user equipment.

Example 42. The apparatus of example 41, further comprising means for performing the method of any of examples 2 to 22.

Example 43. An apparatus, comprising:
means for receiving, from a user equipment and at another user equipment using sidelink communications in a wireless network, a message indicating a limited availability of configured grant resources for the user equipment; and
means for preparing, by the other user equipment, an application in the other user equipment for a less sensitive mode of operation having less quality of service than a mode having a normal quality of service.

Example 44. The apparatus of example 43, further comprising means for performing the method of any of examples 24 to 26.

Example 45. An apparatus, comprising:
means, at a base station in a wireless network, for configuring a user equipment with configured grant resources used to communicate between the user equipment and one or more other user equipment for sidelink communications; and
means for providing, by the base station and using radio resource control procedures, a set of parameters to the user equipment, the set of parameters to be used by the user equipment to form a message for the user equipment to transmit to the one or more other user equipment using sidelink communications, the message indicating to the one or more other user equipment that the user equipment has limited availability of the configured grant resources for the sidelink communications.

Example 46. The apparatus of example 45, further comprising means for performing the method of any of examples 28 to 31.

As used in this application, the term "circuitry" may refer to one or more or all of the following:
(a) hardware-only circuit implementations (such as implementations in only analog and/or digital circuitry) and
(b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method, comprising:
   for a user equipment in a wireless network configured to communicate via sidelink communications with one or more other user equipment, determining, by the user equipment, a specific condition exists indicating the user equipment has limited availability of configured grant resources used to communicate for the sidelink communications, the specific condition comprising a detection of a physical layer problem;
   starting a first timer in response to the detection, the first timer indicating time until a radio link failure is declared;
   determining that the first timer is expired and the user equipment declared the radio link failure;
   based on the first timer expiring and the user equipment declaring the radio link failure:
      sending, by the user equipment and using the sidelink communications, a message indicating the limited availability of the configured grant resources toward the one or more other user equipment;
      starting a second timer indicating a fixed time duration; and setting a third timer;
   determining that a radio resource control connection is recovered after the radio link failure being declared;
   based on the radio resource control connection being recovered after the radio link failure being declared, sending, by the user equipment, a second message to the one or more other user equipment indicating that the message indicating the limited availability of the configured grant resources is annulled;
   determining that the third timer expired;
   based on determining that the third timer expired:
      transitioning the user equipment to idle mode; and
      causing the user equipment to continue to use the configured grant resources to communicate using the sidelink communications with the one or more other user equipment until the second timer expires.

2. The method of claim 1, wherein the sending is performed by the user equipment via unicast, groupcast, or broadcast to the one or more other user equipment.

3. The method of claim 1, wherein the user equipment continues to use, until the second timer expires or for the fixed time duration that begins after the determination the specific condition exists, the configured grant resources to communicate using the sidelink communications with the one or more other user equipment.

4. The method of claim 1, wherein the sidelink is a user equipment to user equipment interface for sidelink communication.

5. The method of claim 4, wherein the sidelink is on a different frequency from an air interface used over a wireless link.

6. The method of claim 4, wherein the sidelink and a Uu interface used over a wireless link operate on a same frequency as Uu communication towards a base station.

7. The method of claim 1, wherein the second timer has a range longer than the third timer.

8. A system comprising:
   a user equipment in a wireless network, the user equipment configured to communicate via sidelink communications with one or more other user equipment;
   a processor; and
   a memory comprising computer-executable instructions that, when executed by the processor, cause the processor to perform the following operations:
   for the user equipment in a wireless network and able to communicate via sidelink communications with one or more other user equipment, determining, by the user equipment, a specific condition exists indicating the user equipment has limited availability of configured grant resources used to communicate for the sidelink communications, the specific condition comprising a detection of a physical layer problem;
   starting a first timer in response to the detection, the first timer indicating time until a radio link failure is declared;
   in response to the first timer expiring and the user equipment declaring the radio link failure:
      sending, by the user equipment and using the sidelink communications, a message indicating the limited availability of the configured grant resources toward the one or more other user equipment;
      starting a second timer indicating a fixed time duration; and
      setting a third timer;

in response to a radio resource control connection being recovered after the radio link failure being declared, sending, by the user equipment, a second message to the one or more other user equipment indicating that the message indicating the limited availability of the configured grant resources is annulled; and in response to the third timer expiring:

transitioning the user equipment to idle mode; and causing the user equipment to continue to use the configured grant resources to communicate using the sidelink communications with the one or more other user equipment until the second timer expires.

9. The system of claim 8, wherein the sending is performed by the user equipment via unicast, groupcast, or broadcast to the one or more other user equipment.

10. The system of claim 9, wherein the user equipment continues to use, until the second timer expires or for the fixed time duration that begins after the determination the specific condition exists, the configured grant resources to communicate using the sidelink communications with the one or more other user equipment.

11. The system of claim 10, wherein the sidelink is a user equipment to user equipment interface for sidelink communication.

12. The system of claim 11, wherein the sidelink is on a different frequency from an air interface used over a wireless link.

13. The system of claim 11, wherein the sidelink and a Uu interface used over a wireless link operate on a same frequency as Uu communication towards a base station.

14. The system of claim 13, wherein the second timer has a range longer than the third timer.

15. A user equipment in a wireless network, the user equipment configured to communicate via sidelink communications with one or more other user equipment, the user equipment comprising:

a processor; and a memory comprising computer-executable instructions that, when executed by the processor, cause the processor to perform the following operations:

for the user equipment in a wireless network and able to communicate via sidelink communications with one or more other user equipment, determining, by the user equipment, a specific condition exists indicating the user equipment has limited availability of configured grant resources used to communicate for the sidelink communications, the specific condition comprising a detection of a physical layer problem;

starting a first timer in response to the detection, the first timer indicating time until a radio link failure is declared;

in response to the first timer expiring and the user equipment declaring the radio link failure:

sending, by the user equipment and using the sidelink communications, a message indicating the limited availability of the configured grant resources toward the one or more other user equipment;

starting a second timer indicating a fixed time duration; and setting a third timer;

in response to a radio resource control connection being recovered after the radio link failure being declared, sending, by the user equipment, a second message to the one or more other user equipment indicating that the message indicating the limited availability of the configured grant resources is annulled; and in response to the third timer expiring:

transitioning the user equipment to idle mode; and causing the user equipment to continue to use the configured grant resources to communicate using the sidelink communications with the one or more other user equipment until the second timer expires.

16. The user equipment of claim 15, wherein the sending is performed by the user equipment via unicast, groupcast, or broadcast to the one or more other user equipment.

17. The user equipment of claim 16, wherein the user equipment continues to use, until the second timer expires or for the fixed time duration that begins after the determination the specific condition exists, the configured grant resources to communicate using the sidelink communications with the one or more other user equipment.

18. The user equipment of claim 17, wherein the sidelink is a user equipment to user equipment interface for sidelink communication.

19. The user equipment of claim 18, wherein the sidelink is on a different frequency from an air interface used over a wireless link.

20. The user equipment of claim 18, wherein the sidelink and a Uu interface used over a wireless link operate on a same frequency as Uu communication towards a base station.

* * * * *